(12) United States Patent
Miura

(10) Patent No.: US 7,563,353 B2
(45) Date of Patent: Jul. 21, 2009

(54) METHOD OF FORMING SN-AG-CU TERNARY ALLOY THIN-FILM ON BASE MATERIAL

(75) Inventor: Shigeki Miura, Osaka (JP)

(73) Assignee: FCM Co., Ltd., Osaka-Shi (JP)

(*) Notice: Subject to any disclaimer, the term of this patent is extended or adjusted under 35 U.S.C. 154(b) by 125 days.

(21) Appl. No.: 11/665,819

(22) PCT Filed: Oct. 19, 2005

(86) PCT No.: PCT/JP2005/019177

§ 371 (c)(1),
(2), (4) Date: Apr. 19, 2007

(87) PCT Pub. No.: WO2006/043578

PCT Pub. Date: Apr. 27, 2006

(65) Prior Publication Data

US 2007/0297937 A1    Dec. 27, 2007

(30) Foreign Application Priority Data

Oct. 21, 2004  (JP) ............... 2004-307115
Feb. 7, 2005   (JP) ............... 2005-030837
Apr. 13, 2005  (JP) ............... 2005-115940

(51) Int. Cl.
*C25D 3/56*   (2006.01)
*C25D 3/60*   (2006.01)
*C25D 5/02*   (2006.01)

(52) U.S. Cl. .............. 205/241; 205/242; 205/253; 205/118

(58) Field of Classification Search ........... 428/615, 428/646, 673, 674, 411.1; 205/241, 242, 205/253, 118
See application file for complete search history.

(56) References Cited

U.S. PATENT DOCUMENTS

| | | | |
|---|---|---|---|
| 5,109,145 A | 4/1992 | Fujita et al. | |
| 6,500,327 B1 | 12/2002 | Saitoh et al. | |
| 6,607,653 B1 * | 8/2003 | Tsuji et al. | 205/241 |
| 6,805,974 B2 * | 10/2004 | Choi et al. | 428/646 |
| 6,896,172 B2 * | 5/2005 | Taguchi et al. | 228/180.1 |
| 2003/0150743 A1 * | 8/2003 | Obata et al. | 205/252 |
| 2005/0123784 A1 | 6/2005 | Miura | |

FOREIGN PATENT DOCUMENTS

| | | | |
|---|---|---|---|
| JP | 56-72196 A | 6/1981 | |
| JP | 1-298617 A | 12/1989 | |
| JP | 5-50286 A | 3/1993 | |
| JP | 05050286 A | * | 3/1993 |
| JP | 9-302498 A | 11/1997 | |
| JP | 10-229152 A | 8/1998 | |
| JP | 10229152 A | * | 8/1998 |
| JP | 11-21692 A | 1/1999 | |
| JP | 11-21693 A | 1/1999 | |
| JP | 2000-234195 A | 8/2000 | |
| JP | 2000-328286 A | 11/2000 | |
| JP | 2001-26898 A | 1/2001 | |
| JP | 2001-164396 A | 6/2001 | |
| JP | 2001-342592 A | 12/2001 | |
| JP | 2002-80993 A | 3/2002 | |
| JP | 2003-96590 A | 4/2003 | |
| JP | 2003-328182 A | 11/2003 | |
| JP | 2003-342784 A | 12/2003 | |
| JP | 2003342784 A | * | 12/2003 |
| JP | 2004-183091 A | 7/2004 | |
| JP | 2004183091 A | * | 7/2004 |
| JP | 2006-118001 A | 5/2006 | |
| KR | 2005-0053319 A | 6/2005 | |

OTHER PUBLICATIONS

Zribi et al., "The Growth of Intermetallic Compounds at Sn-Ag-Cu Solder/Cu and Sn-Ag-Cu Solder/Ni Interfaces and the Associated Evolution of Solder Microstructure", J. of Electronic Materials (no month, 2001), vol. 30, No. 6, pp. 1157-1164.*

Office Action dated Dec. 14, 2004 issued in basic Japanese Patent Application No. 2004-307115 with English Translation (Documents Cited: B10 and B11).

Office Action dated Mar. 15, 2005 issued in basic Japanese Patent Application No. 2005-030837 with English Translation (Documents Cited: B18, B12-B15).

Office Action dated Jun. 7, 2005 issued in basic Japanese Patent Applicaton No. 2005-030837 with English Translation (Documents Cited: B2, B7-B9, B12, B13, B16, B17).

US 4,940,863, 07/1990, Fujita et al. (withdrawn)

\* cited by examiner

*Primary Examiner*—Edna Wong
(74) *Attorney, Agent, or Firm*—Birch, Stewart, Kolasch & Birch, LLP

(57) ABSTRACT

A method of forming an Sn—Ag—Cu ternary alloy thin-film of the present invention forms the ternary alloy thin-film by electroplating. A plating bath contains an Sn compound, an Ag compound, a Cu compound, an inorganic chelating agent and an organic chelating agent. The inorganic chelating agent is one of a polymerized phosphate-based chelating agent and a chelating agent represented by a chemical formula (I): $MF_x^{(X-Y)-}$ ... (I) where M is an arbitrary metal, X is an arbitrary natural number and Y is an oxidation number of M. The organic chelating agent is one of porphyrins, dipivaloylmethane, phthalocyanines and a compound represented by a chemical formula (II): $R—(CH_2CH_2O)_n\text{-}A$ ... (II) where R is an alkyl group having a carbon number of 8 to 30, A is $CH_2COONa$ or $CH_2SO_4Na$ and n is a natural number.

11 Claims, No Drawings

METHOD OF FORMING SN-AG-CU TERNARY ALLOY THIN-FILM ON BASE MATERIAL

TECHNICAL FIELD

The present invention relates to a method of forming an Sn—Ag—Cu ternary alloy thin-film on a base material. More specifically, the invention relates to a method of forming an Sn—Ag—Cu ternary alloy thin-film that can be used very usefully for such an article as a terminal (for example, connector, relay, slide switch, soldered terminals) that is widely used for connection in an electrical/electronic product, a semiconductor product, an automobile, or the like.

BACKGROUND ART

Means for conducting electricity in various products such as a semiconductor product, an electrical product, an electronic product, a solar battery, and an automobile can be a method of soldering or making contact using a terminal formed with a conductive base.

For such a terminal as described above, in order to improve solderability or corrosion resistance of the surface of the conductive base, the surface is usually covered with a metal such as Au, Ag, Pd, Cu, Ni, In, Sn and Sn—Pb alloy (Japanese Patent Laying-Open No. 1-298617 (Patent Document 1) for example). Among these metals, Sn and Sn—Pb alloy are most commonly used in consideration of the cost and the like, and the electroplating method is usually adopted as a method of covering.

When the electroplating is performed with Sn alone, however, a large columnar crystal is generated in the thin covering film, which promotes generation of a whisker. Since generation of the whisker causes an electrical short circuit, the generation thereof is required to be prevented.

As means for preventing the generation of the whisker, alloying of Sn, that is, use of an Sn—Pb alloy or the like has been conventionally attempted. Since Pb is a toxic metal as is well-known, however, use thereof is limited from environmental considerations. Further, when the Sn—Pb alloy is used for such a product as automobile where considerable vibrations occur, the surface could be oxidized due to rubbing to cause an increase in contact resistance and thereby cause an undesirable phenomenon that is so-called fretting wear.

Therefore, attempts have been made to develop methods of forming various Sn-based alloys by means of electroplating as substitutes for the Sn—Pb alloy and to use these alloys in combination with a layer plated with Sn alone (Japanese Patent Laying-Open No. 10-229152 (Patent Document 2), Japanese Patent Laying-Open No. 2003-342784 (Patent Document 3)). Regarding an Sn—Cu alloy for example, although it has a minimum melting point (227° C.) and shows good solderability with 99.3 mass % of Sn and 0.7 mass % of Cu, generation of the whisker (columnar crystal) cannot be effectively prevented because of the small content of Cu. In contrast, if the content of Cu is increased, the melting point significantly increases and thus the solderability is deteriorated.

The Sn-based alloy is sometimes used in melting solder such as solder dip or cream solder only for adhering the terminal as mentioned above. As such an Sn-based alloy, an alloy made of Sn, Ag and Cu is used in some cases (Japanese Patent Laying-Open No. 5-50286 (Patent Document 4)).

The Sn-based alloy used in such a manner as described above, however, merely shows an adhesion property by heat melting (melting solder) of each metal of Sn, Ag and Cu (or an ingot obtained by melting and mixing these metals), and an application thickness thereof cannot be controlled. Therefore, on the base material, a uniform coating of a thin film having a small thickness of at most 100 μm cannot be formed.

If the uniform coating of the thin film having a small thickness cannot be formed, lack of stability in appearance properties occurs and an electrical short circuit is caused. Furthermore, a pinhole or the like is easily generated to cause deterioration in corrosion resistance.

In attempt to solve the above-described problems, a proposal has been made concerning such a terminal as connector plated with a tin-silver-copper ternary alloy (Japanese Patent Laying-Open No. 2001-164396 (Patent Document 5)). A method shown by this proposal, however, is characterized by a plating bath containing a specific sulfur compound to prevent a copper compound in the plating bath from being deposited on a tin electrode. The concentration of the sulfur compound, however, must be increased to increase the concentration of the copper compound in the plating bath, which could destroy the balance of components in the plating bath. Therefore, the copper compound of a high concentration cannot be used in the plating bath and the concentration of copper in the tin-silver-copper ternary alloy plating film cannot be increased, which results in a problem that a thin plating film having a low melting point cannot be obtained.

Further, a proposal has also been made regarding tin-silver-copper ternary alloy plating using water-soluble silver salt together with water-soluble tin salt and water-soluble copper salt (Japanese Patent Laying-Open No. 2001-26898 (Patent Document 6). According to the proposal, however, such a sulfur compound as thioamide compound or thiol compound is used, which results in a problem, like the aforementioned one, that a thin plating film having a low melting point cannot be obtained.

Patent Document 1: Japanese Patent Laying-Open No. 1-298617

Patent Document 2: Japanese Patent Laying-Open No. 10-229152

Patent Document 3: Japanese Patent Laying-Open No. 2003-342784

Patent Document 4: Japanese Patent Laying-Open No. 5-50286

Patent Document 5: Japanese Patent Laying-Open No. 2001-164396

Patent Document 6: Japanese Patent Laying-Open No. 2001-26898

DISCLOSURE OF THE INVENTION

Problems to be Solved by the Invention

The present invention has been made in view of the above-described current circumstances. An object of the present invention is to provide a method of forming an Sn alloy thin film having a thin and uniform thickness, simultaneously achieving both of prevention of whisker generation and good solderability (low melting point) without being accompanied by such a disadvantage as fretting wear.

Means for Solving the Problems

The present invention is a method of forming an Sn—Ag—Cu ternary alloy thin-film on a base material. The method includes the step of immersing the base material in a plating bath to form the Sn—Ag—Cu ternary alloy thin-film by electroplating entirely or partially on the base material. The plating bath contains at least an Sn compound, an Ag compound, a Cu compound, an inorganic chelating agent, and an organic chelating agent. The inorganic chelating agent is one of a polymerized phosphate-based chelating agent and a metal fluoro complex-based chelating agent represented by a chemical formula (I):

$$MF_x^{(X-Y)-} \quad (I)$$

where M is an arbitrary metal, X is an arbitrary natural number and Y is an oxidation number of M, and at least 1 part by mass and at most 300 parts by mass of the inorganic chelating agent is contained relative to 1 part by mass of the Ag compound. The organic chelating agent is one of porphyrins, dipivaloylmethane, phthalocyanines and a compound represented by a chemical formula (II):

$$R-(CH_2CH_2O)_n-A \quad (II)$$

where R is an alkyl group having a carbon number of 8 to 30, A is $CH_2COONa$ or $CH_2SO_4Na$ and n is a natural number, and at least 1 part by mass and at most 200 parts by mass of the organic chelating agent is contained relative to 1 part by mass of the Cu compound.

It is preferable to employ the combination that the inorganic chelating agent is the polymerized phosphate-based chelating agent and the organic chelating agent is any of the porphyrins. It is also preferable to employ the combination that the inorganic chelating agent is the metal fluoro complex-based chelating agent represented by the chemical formula (I) and the organic chelating agent is any of the porphyrins. It is also preferable to employ the combination that the inorganic chelating agent is the metal fluoro complex-based chelating agent represented by the chemical formula (I) and the organic chelating agent is the compound represented by the chemical formula (II).

Preferably, the Sn compound, the Ag compound and the Cu compound are each a soluble salt containing a common anion as a counter ion. The polymerized phosphate-based chelating agent is preferably a salt of a polymerized phosphoric acid and a metal that is at least one of Na, K, Mg, Al and Mn, and the metal fluoro complex-based chelating agent is preferably one of $TiF_6^{2-}$ and $SiF_6^{2-}$.

The Sn—Ag—Cu ternary alloy thin-film is composed of 70 to 99.8 mass % of Sn, 0.1 to 15 mass % of Ag and 0.1 to 15 mass % of Cu, has a melting point of 200 to 240° C. and can be formed in a fine granular crystalline state relative to a thin film made of Sn alone.

The base material may be an electrically conductive base. The base material may also be an electrically conductive base having an Sn layer formed entirely or partially on the electrically conductive base. An insoluble plate may be used as an anode in the plating bath.

An article of the present invention may be an article having an Sn—Ag—Cu ternary alloy thin-film formed on a base material by the method as described above. The article may be one of connector, relay, slide switch, resistor, capacitor, coil and substrate.

EFFECTS OF THE INVENTION

The present invention employs the structure as described above so that an Sn—Ag—Cu ternary alloy thin-film having a thin and uniform thickness can be formed, while simultaneously achieving both of prevention of whisker generation and good solderability (low melting point) without being accompanied by such a disadvantage as fretting wear since no lead (Pb) is contained.

BEST MODES FOR CARRYING OUT THE INVENTION

<Method of Forming Sn—Ag—Cu Ternary Alloy Thin-Film>

The present invention is a method of forming an Sn—Ag—Cu ternary alloy thin-film on a base material. The method immerses the base material in a plating bath to form the Sn—Ag—Cu ternary alloy thin-film by electroplating entirely or partially on the base material. In the following specific description of the method of forming the thin film, the Sn—Ag—Cu ternary alloy thin-film is first described.

<Sn—Ag—Cu Ternary Alloy Thin-Film>

The Sn—Ag—Cu ternary alloy thin-film of the present invention is comprised of only three different metals of Sn, Ag and Cu, except for a trace amount of unavoidable impurities mixed therein. In particular, preferably the thin film has an Sn content of 70 to 99.8 mass %, an Ag content of 0.1 to 15 mass % and a Cu content of 0.1 to 15 mass %, has a melting point of 200 to 240° C. and is preferably formed in a fine granular crystalline state relative to a thin film made of Sn alone. The Sn—Ag—Cu ternary alloy thin-film structured in the above-described manner encounters no whisker generation and shows a satisfactory low melting point. Further, the thin film does not contain lead and thus does not encounter such a disadvantage as fretting wear, and the film has a thin and uniform thickness. Such excellent properties are provided for the first time by the method of forming the thin film of the present invention.

Here, in the Sn—Ag—Cu ternary alloy thin-film, the upper limit of the Sn content is more preferably 97 mass % and still more preferably 95 mass %, and the lower limit of the Sn content is more preferably 80 mass % and still more preferably 90 mass %. When the Sn content is less than 70 mass %, the melting point is excessively high and good solderability (low melting point) may not be obtained. When the Sn content is more than 99.8 mass %, the whisker is markedly generated.

Further, the upper limit of the Ag content is more preferably 12 mass % and still more preferably 8 mass %, and the lower limit of the Ag content is more preferably 0.5 mass % and still more preferably 1 mass %. When the Ag content is less than 0.1 mass %, the whisker is markedly generated. When the Ag content is more than 15 mass %, the melting point is excessively high and good solderability may not be obtained.

Furthermore, the upper limit of the Cu content is more preferably 12 mass % and still more preferably 8 mass %, and the lower limit of the Cu content is 0.5 mass % and still more preferably 1 mass %. When the Cu content is less than 0.1 mass %, the whisker is markedly generated. When the Cu content is more than 15 mass %, the melting point is excessively high and good solderability may not be obtained.

Preferably the Sn—Ag—Cu ternary alloy thin-film has the contents as described above and thereby has the melting point of 200 to 240° C. The upper limit of the melting point is more preferably 235° C. and still more preferably 230° C., and the lower limit thereof is more preferably 205° C. and still more preferably 210° C. The melting point in the range as described above provides good solderability.

Moreover, since the Sn—Ag—Cu ternary alloy thin-film is formed by electroplating, the thickness can be made thin and uniform and the hardness of the film can be controlled freely. Therefore, the Sn—Ag—Cu ternary alloy thin-film is preferably formed to have a thickness of 0.1 to 100 μm. The upper limit of the thickness is more preferably 12 μm and still more preferably 8 μm, and the lower limit thereof is more preferably 0.5 μm and still more preferably 1.5 μm.

The Sn—Ag—Cu ternary alloy thin-film has a fine granular crystalline state as compared with a thin film made of Sn alone. Such a fine granular crystalline state cannot be generated by any method except for electroplating.

Further, when the thin film is formed to have a fine granular crystalline state as that of the present application, various additives present in gaps between crystal particles act as impurities for crystal particles and the thin film are melted in a soldering process at a temperature lower than the inherent melting point of the crystal particles, which remarkably improves solderability.

Here, the fact that the Sn—Ag—Cu ternary alloy thin-film is formed in a fine granular crystalline state relative to a thin film made of Sn alone refers to the state in which particles are formed to have a smaller particle size as compared with a columnar crystal or a huge crystal having the thickness (length) almost equal to the thickness of the thin film of Sn alone. In the ternary alloy thin film, the particle size is 0.01 to 10 μm, the upper limit of the particle size is more preferably 5 μm and still more preferably 3 μm, and the lower limit thereof is more preferably 0.1 μm and still more preferably 0.5 μm.

<Plating Bath>

The Sn—Ag—Cu ternary alloy thin-film having excellent properties as described above can be formed by immersing and thereby electroplating a base material (material to be plated) in a plating bath (containing water as a medium) having the composition as described below.

Specifically, the plating bath of the present invention contains at least an Sn compound, an Ag compound, a Cu compound, an inorganic chelating agent and an organic chelating agent. The content of the inorganic chelating agent is at least 1 part by mass and at most 300 parts by mass relative to 1 part by mass of the Ag compound, and the content of the organic chelating agent is at least 1 part by mass and at most 200 parts by mass relative to 1 part by mass of the Cu compound.

Here, the above-described Sn compound refers to a compound containing at least Sn and examples of the Sn compound include stannous oxide, stannous sulfate and tin salts of various organic acids, for example. The above-described Ag compound refers to a compound containing at least Ag and examples of the Ag compound include silver oxide and silver salts of various organic acids, for example. The above-described Cu compound refers to a compound containing at least Cu and examples of the Cu compound include copper sulfate, copper chloride and copper salts of various organic acids, for example.

It is particularly preferable that the Sn compound, the Ag compound and the Cu compound are each a soluble salt containing an anion common to these compounds as a counter ion. This, together with the inorganic chelating agent and the organic chelating agent used in combination can very effectively prevent isolation and precipitation of Ag and Cu out of the plating bath. The anion as such may be, for example, an anion derived from an inorganic acid, such as a sulfate ion, a nitrate ion, a phosphate ion, a chloride ion, or a hydrofluoric acid ion, or an anion derived from an organic acid such as methanesulfonic acid, ethanesulfonic acid, propanesulfonic acid, benzenesulfonic acid, phenolsulfonic acid, alkylarylsulfonic acid, alkanolsulfonic acid, formic acid, acetic acid, propionic acid, butyric acid, benzoic acid, phthalic acid, oxalic acid, adipic acid, lactic acid, citric acid, malonic acid, succinic acid, tartaric acid, or malic acid, such as a methanesulfonate anion or an ethanesulfonate anion.

The plating bath of the present invention is characterized in that the bath contains these Sn compound, Ag compound and Cu compound and further contains the inorganic chelating agent and the organic chelating agent. Conventionally, in a plating bath containing compounds (salts) of a plurality of different metals of Sn, Ag and Cu, any of the metals, particularly Ag and Cu are readily isolated and precipitated and there is a difference in speed of precipitation onto the base material, which makes it considerably difficult to obtain an Sn—Ag—Cu ternary alloy thin-film with a desired composition. This occurs particularly remarkably when respective concentrations of Ag and Cu in the plating bath are high. Therefore, it has been difficult to achieve the effects of prevention of whisker generation and achievement of a low melting point for an Sn—Ag—Cu ternary alloy thin-film by containing high concentrations of Ag and Cu in the Sn—Ag—Cu ternary alloy thin-film.

The present invention appropriately solves this problem by using a specific inorganic chelating agent and a specific organic chelating agent in combination so that isolation and precipitation of Ag and Cu out of the plating bath can be very effectively prevented and the speed of precipitation of each metal onto the base material can be adjusted. In other words, through researches by the inventor of the present invention, it has been found that the effective prevention of isolation and precipitation of Ag and the effective prevention of isolation and precipitation of Cu might be achieved by different types of chelating agents respectively. Through further researches, it has been found out that a specific inorganic chelating agent is particularly effective for the isolation and precipitation of Ag while a particular organic chelating agent is particularly effective for the isolation and precipitation of Cu. Together with this, it has been found out that these inorganic and organic chelating agents can be used in combination to adjust the speed of precipitation of each metal onto the base material.

Moreover, it has been found out that, when the content of the inorganic chelating agent is at least 1 part by mass and at most 300 parts by mass relative to 1 part by mass of the Ag compound and the content of the organic chelating agent is at least 1 part by mass and at most 200 parts by mass relative to 1 part by mass of the Cu compound, isolation and precipitation of Ag and Cu can be effectively prevented constantly and the speed of precipitation of each metal onto the base material can be adjusted effectively. When the content of the inorganic chelating agent is less than 1 part by mass, Ag is isolated and precipitated, and when the content thereof exceeds 300 parts by mass, the balance of the plating bath itself is lost, resulting in aggregation and precipitation of the organic chelating agent for example. When the content of the organic chelating agent is less than 1 part by mass, Cu is isolated and precipitated, and when the content thereof exceeds 200 parts by mass, the balance of the plating bath itself is lost, resulting in aggregation and precipitation of the inorganic chelating agent for example.

As to the content of the inorganic chelating agent relative to that of the Ag compound, the upper limit is preferably 200 parts by mass and more preferably 150 parts by mass, and the lower limit is preferably 3 parts by mass and more preferably 4 parts by mass. Further, as to the content of the organic chelating agent relative to that of the Cu compound, the upper limit is preferably 150 parts by mass and more preferably 130 parts by mass, and the lower-limit is preferably 2 parts by mass and more preferably 3 parts by mass.

Here, the inorganic chelating agent as described above refers to a chelating agent made from an inorganic compound, which may be, for example, a polymerized phosphate-based chelating agent (also referred to as condensed phosphate-based chelating agent), or a metal fluoro complex-based chelating agent represented by the following chemical formula (I).

$$MF_X(X-Y)- \quad (I)$$

In chemical formula (I), M is an arbitrary metal, X is an arbitrary natural number and Y is an oxidation number of M.

More specifically, the polymerized phosphate-based chelating agent may be a salt of a polymerized phosphoric acid and at least one of Na, K, Mg, Al and Mn. The polymerized phosphoric acid may be, for example, polyphosphoric acid in a broad sense (namely including polymerized phosphoric acid and condensed phosphoric acid), pyrophosphoric acid, triphosphoric acid, trimetaphosphoric acid or tetrametaphosphoric acid that forms a bidentate ligand, tridentate ligand or the like with any of various metals and oxygen to show a chelating action.

The metal fluoro complex-based chelating agent represented by the above chemical formula (I) may be the one where M is such a metal as Ti, Si, Sb, Ta or the like and X is 6 for example, and include the one in clustered form. More specifically, it may be $TiF_6^{2-}$ (oxidation number of Ti is 4), $SiF_6^{2-}$ (oxidation number of Si is 4), $TiF_6^{2-}$ in clustered form, or $SiF_6^{2-}$ in clustered form. Even if the chelating agent is clustered as described above, it is supposed in the present application that the chelating agent is represented by the above chemical formula (I). If such a metal fluoro complex-based chelating agent as described above is used, for providing free fluoride ions as stable complex ions, preferably boric acid for example is used as an additive in combination as a fluoride ion capturing agent, for example.

The organic chelating agent refers to a chelating agent made from an organic compound, which may be, for example, porphyrins, dipivaloylmethane (2,2,6,6-tetramethyl-3,5-heptanedione), phthalocyanines, or a compound represented by the following chemical formula (II).

$$R-(CH_2CH_2O)_n-A \quad (II)$$

In chemical formula (II), R is an alkyl group with a carbon number of 8 to 30, A is $CH_2COONa$ or $CH_2SO_4Na$ and n is a natural number.

Here, the above-described porphyrins refer to a compound having a so-called porphyrin skeleton in a molecule and include various derivatives. Examples may be, for example, porphyrin (21H,23H-porphin), 2,3-dihydroporphyrin, 5,22-dihydroporphyrin, 5,15-dihydroporphyrin, 5,10,15,22-tetrahydroporphyrin, 7,8,17,18-tetrahydroporphyrin, 2,3,7,8-tetrahydroporphyrin, 5,10,15,20,22,24-hexahydroporphyrin, 21,22,17,18-tetrahydrocyclopenta[at]porphyrin, 5,10,15,20-tetraazaporphyrin, 3,4-didehydro-9,14-diethyl-4,8,13,18-tetramethyl-20-oxo-3-phorbinepropanoic acid, 3-formyl-8-[(4E,8E)-1-hydroxy-5,9,13-trimethyltetradeca-4,8,12-trien-1-yl]-7,12,17-trimethyl-13-vinylporphyrin-2,18-dipropanoic acid, 3,8,13,18-tetrakis(carboxymethyl)porphyrin-2,7,12,17-tetrapropanoic acid, 3,7,13,17-tetrakis(carboxymethyl)porphyrin-2,8,12,18-tetrapropanoic acid, 3,8,13,17-tetrakis(carboxymethyl)porphyrin-2,7,12,18-tetrapropanoic acid, 3,8,12,17-tetrakis(carboxymethyl)porphyrin-2,7,13,18-tetrapropanoic acid, 3,8,13,18-tetramethylporphyrin-2,7,12,17-tetrapropanoic acid, 3,7,13,17-tetramethylporphyrin-2,8,12,18-tetrapropanoic acid, 3,8,13,17-tetramethylporphyrin-2,7,12,18-tetrapropanoic acid, 3,8,12,17-tetramethylporphyrin-2,7,13,18-tetrapropanoic acid, 7,12-bis(1-hydroxyethyl)-3,8,13,17-tetramethylporphyrin-2,18-dipropanoic acid, 7,12-diethyl-3,8,13,17-tetramethylporphyrin-2,18-dipropanoic acid, 3,7,12,17-tetramethyl-8, 13-divinylporphyrin-2,18-dipropanoic acid, 18-carboxy-8,13-diethyl-3,7,12,17-tetramethylporphyrin-2-propanoic acid, 8,13-diethyl-3,7,12,17,20-pentamethylporphyrin-2-propanoic acid, 2,7,12,17-tetraethyl-3,8,13,18-tetramethylporphyrin, 2,8,12,18-tetraethyl-3,7,13,17-tetramethylporphyrin, 2,7,12,18-tetraethyl-3,8,13,17-tetramethylporphyrin, 2,7,13,18-tetraethyl-3,8,12,17-tetramethylporphyrin, 8,13-diethyl-3,7,12,17-tetramethylporphyrin-2-propanoic acid, 3,7,12,17-tetramethylporphyrin-2,18-dipropanoic acid, (17S,18S)-7, 12-diethyl-$2^1,2^2$,17,18-tetrahydro-3,8,13,17-tetramethyl-$2^1$-oxocyclopenta[at]porphyrin-18-propionic acid, (2S,3S)-18-carboxy-8,13-diethyl-3,7,12,17-tetramethylchlorin-2-propionic acid, (2S,3S)-8,13-diethyl-3,7,12,17,20-pentamethylchlorin-2-propionic acid, (2S,3S)-8,13-diethyl-3,7,12,17-tetramethylchlorin-2-propionic acid, tetranaphthylporphyrin, tetraphenylporphyrin ($C_{44}H_{30}N_4$), sodium copper chlorophyllin ($C_{34}H_{31}CuN_4Na_3O_6$).

The phthalocyanines refer to a compound having a so-called phthalocyanine skeleton in a molecule and include various derivatives. The kind of the central metal in the compound is not limited to a particular one (in this respect, including the one having no central metal while including hydrogen coupling), and may be preferably Na (sodium phthalocyanine) or Cu (copper phthalocyanine) for example.

A compound represented by chemical formula (II) as described above may be preferably the one where R is an alkyl group having a carbon number of 12 to 18, A is $CH_2COONa$ or $CH_2SO_4Na$ and n is a natural number from 1 to 10. More specifically, it may be a compound where R is a lauryl, A is $CH_2COONa$ and n is 3.

The inorganic chelating agents and the organic chelating agents as describe above may be used singly or as a combination of at least two of them. Further, the combination of the inorganic chelating agent and the organic chelating agent in use is not limited to a particular one. However, it is particularly preferable to employ a combination of a polymerized phosphate-based chelating agent used as the inorganic chelating agent and any of porphyrins as the organic chelating agent, or a combination of a metal fluoro complex-based chelating agent represented by chemical formula (I) as the inorganic chelating agent and any of porphyrins as the organic chelating agent.

In the case where a compound represented by chemical formula (II) is used as the organic chelating agent, it tends to occur that satisfactory effects are selectively provided when a metal fluoro complex-based chelating agent represented by chemical formula (I) is used as the inorganic chelating agent. Therefore, in the case where a compound represented by chemical formula (II) is used as the organic chelating agent, it is particularly preferable to use a metal fluoro complex-based chelating agent represented by chemical formula (I) instead of a polymerized phosphate-based chelating agent as the inorganic chelating agent.

The inorganic chelating agents and the organic chelating agents as described above are not those showing the usual chelating effect only. Some of them have the effect of providing stabilization by surrounding the target metal and being clustered there.

When the inorganic chelating agent and the organic chelating agent as described above by way of examples are used in combination, it does not occur that a metal contained in the inorganic chelating agent acts like a catalyst to cause polymerization of an aliphatic group or the like contained in the organic chelating agent, which is thus fairly preferable since the disadvantage of precipitation of a polymerized organic chelating agent out of the plating bath can be prevented.

The plating bath of the present invention may contain various additives in addition to the compounds each as described above. As such additives, any of known additives may be used without particular limitations. The additives may be, for example, inorganic acid, organic acid (as the inorganic acid and organic acid, those dissociated to release the same anion as the anion contained in the Sn compound, Ag compound and Cu compound are preferred), polyethylene glycol, polyoxy alkylene naphthol, aromatic carbonyl compound, aromatic sulfonic acid, glue, and boric acid.

<Plate>

In the plating bath as described above, it is preferable that, for a positive electrode, Sn, Sn alloy or insoluble plate is used and it is particularly preferable to use the insoluble plate. This is for the reason that the use of the insoluble plate together with the inorganic chelating agent and the organic chelating agent used in combination can very effectively prevent isolation and precipitation of Ag and Cu out of the plating bath, particularly prevent Ag and Cu from being deposited on the anode. Therefore, the Ag compound and the Cu compound of high concentrations respectively can be contained in the plating bath, and the Ag content and the Cu content in the Sn—Ag—Cu ternary alloy thin-film can be increased. Thus, prevention of whisker generation and satisfactory solderability (low melting point) can very effectively achieved at the same time.

Here, the insoluble plate refers to an electrode made of Ti having its surface coated with, for example, Pt, Ir, Ru or Rh or with at least two of them. In particular, an Ti electrode with its surface coated with Pt can be used to more effectively prevent the aforementioned Ag, Cu deposition on the anode and thus can be a particularly favorable example.

<Base Material>

The base material of the present invention is a material to be plated, and the base material is not limited to a particular kind of material. As long as the Sn—Ag—Cu ternary alloy thin-film can be formed entirely or partially on the base material by electroplating, any kind of base material may be used. An example of such a base material is preferably an electrically conductive base.

Such an electrically conductive base may be any as long as it is a conventionally known conductive base used for, for example, an electric/electronic product, semiconductor product or automobile. For example, the conductive base of the present invention includes any conductive base provided that it has a metal at least on a surface thereof, such as copper (Cu), a material based on a copper alloy such as phosphor bronze, brass, beryllium copper, titanium copper, or nickel silver (Cu, Ni, Zn), iron (Fe), a material based on an iron alloy such as an Fe—Ni alloy or stainless steel, any of other metals such as a nickel-based material. Therefore, a copper pattern on any kind of substrate, for example, is also included. Thus, a suitable example of the conductive base to be used as the base material of the present invention may be any kind of metal or an insulating base formed of a polymer film, ceramic, or the like, having a metal layer (that is, any kind of circuit pattern) formed thereon. It is to be noted that, the form of the conductive base is not limited to a two-dimensional form such as tape-like form, and a three-dimensional form such as press-molded product or any other form may be included.

Furthermore, a suitable base material of the present invention may be the one having an Sn layer formed entirely or partially on a conductive base as described above. When such a base material is used, the Sn—Ag—Cu ternary alloy thin-film will be formed entirely or partially at least on the Sn layer.

A merit in using a base material having the Sn layer formed entirely or partially on the conductive base as described above is that, from a viewpoint of achieving prevention of whisker generation and a low melting point, an effect similar to that derived from an Sn—Ag—Cu ternary alloy thin-film of the present invention directly formed on the conductive base is obtained at a low cost. This is because the amounts of relatively expensive Sn, Ag and Cu compounds used to form the Sn—Ag—Cu ternary alloy thin-film of the present invention can be substantially decreased. Therefore, use of the base material having the Sn layer as formed is particularly advantageous when the Sn—Ag—Cu ternary alloy thin-film is required to be formed on a large area or when the Sn—Ag—Cu ternary alloy thin-film is required to be formed with a large thickness.

The Sn layer as described above is preferably formed on the conductive base by electroplating, and the electroplating using Sn for an anode is especially advantageous in terms of the cost. The Sn layer can be usually formed on the conductive base with a thickness of 0.1 to 80 µm.

<Details of the Method of Formation>

A method of forming an Sn—Ag—Cu ternary alloy thin-film of the present invention immerses a base material as described above in a plating bath to form the Sn—Ag—Cu ternary alloy thin-film entirely or partially on the base material by electroplating. The method of the formation of the present invention may include a pretreatment step and a step of forming a ground layer for example in addition to the step of electroplating. More details are given below.

<Pretreatment Step>

The method of forming an Sn—Ag—Cu ternary alloy thin-film of the present invention may include, prior to the step of forming the Sn—Ag—Cu ternary alloy thin-film entirely or partially on the base material by electroplating, a pretreatment step of performing pretreatment of the base material.

The pretreatment step is performed in order to form the Sn—Ag—Cu ternary alloy thin-film stably with high adhesion and without generation of the pinhole. The pretreatment step is particularly effective when the base material is a rolled metal such as phosphor bronze.

Specifically, the pretreatment step can be performed by allowing an acid having a pH of at most 5 to act on at least a portion of the base material where the Sn—Ag—Cu ternary alloy thin-film is to be formed (acid treatment). In addition, the pretreatment step of the present invention preferably includes a first washing step of immersing the base material in an aqueous solution, a second washing step of electrolyzing the base material in an aqueous solution, and an acid treatment step of allowing an acid having a pH of at most 5 to act on the base material.

More specifically, the first washing step is performed by immersing the base material in a bath filled with the aqueous solution, and washing with water is repeated several times.

The aqueous solution in the first washing step preferably has a pH of at least 0.01, and treatment in an alkaline condition with a pH of at least 9 is more preferable. A specific range of the pH is at most 13.8, more preferably 13.5, and at least 9.5, more preferably 10. The pH lower than 0.01 or higher than 13.8 is not preferable because a surface of the base material will be excessively roughened or deteriorated.

An alkali to be used is not specifically limited as long as the pH is within the range described above. A wide variety of substances such as sodium hydroxide, potassium hydroxide, calcium hydroxide, a chelating agent, and an interface-active agent may be used. In addition, the temperature of the aqueous solution in the first washing step is 20 to 90° C., preferably 40 to 60° C.

Subsequently, the second washing step is performed by electrolysis in the aqueous solution using the base material as an electrode, and washing with water is again repeated several times. Accordingly, gas is generated on the surface of the base material, and contamination of the surface of the base material is removed more efficiently by an oxidation-reduction action with the gas and a physical action with bubbles of the gas.

The aqueous solution in the second washing step preferably has a pH of at least 0.01, and treatment in an alkaline condition with a pH of at least 9 is more preferable. A specific range of the pH is at most 13.8, more preferably 13.5, and at least 9.5, more preferably 10. The pH lower than 0.01 or higher than 13.8 is not preferable because the surface of the conductive base will be excessively roughened or deteriorated.

An alkali to be used is not specifically limited as long as the pH is within the range described above. A wide variety of substances such as sodium hydroxide, potassium hydroxide, calcium hydroxide, a chelating agent, and an interface-active agent may be used.

In addition, conditions of the electrolysis may include a liquid temperature of 20 to 90° C., preferably 30 to 60° C., a current density of 0.1 to 20 $A/dm^2$, preferably 2 to 8 $A/dm^2$, and an electrolysis time of 0.1 to 5 minutes, preferably 0.5 to 2 minutes. The base material may be used as an anode or a cathode, and a switch may be made between the anode and cathode successively during the process.

Thereafter, the acid treatment (activation treatment) may be performed by immersing the base material in a bath containing an acid such as sulfuric acid, hydrochloric acid, ammonium persulfate, or hydrogen peroxide to allow the acid to act on the surface of the base material.

The acid preferably has a pH of at most 6. The pH is more preferably at most 4.5, still more preferably 3, and preferably at least 0.001, more preferably 0.1. Activation cannot be performed sufficiently when the pH is higher than 6. The base material will be excessively roughened or deteriorated when the pH is lower than 0.001, which is thus not preferable.

In addition, the immersion time for which the base material is immersed in the bath containing the acid is preferably 0.1 to 10 minutes, more preferably at most 5 minutes, still more preferably 3 minutes, and more preferably at least 0.5 minutes, still more preferably 1 minute. Activation cannot be performed sufficiently when the immersion time is shorter than 0.1 minute, while the surface of the base material will be excessively roughened or deteriorated when the immersion time is longer than 10 minutes, which is thus not preferable.

When the base material is the one having a polymer film on which a copper layer made of copper or a copper alloy is formed in the form of a circuit, only the treatment with acid (acid treatment) may be performed without performing the first washing step and the second washing step as described above. This is for preventing the polymer film from being deteriorated by washing with the alkali. In this case as well, for the treatment with acid (acid treatment), conditions similar to those as described above may be adopted.

By performing the pretreatment of the surface of the base material as described above, the Sn—Ag—Cu ternary alloy thin-film can be formed on the base material without generation of the pinhole and with uniform and strong adhesion.

<Step of Forming Ground Layer>

The method of forming an Sn—Ag—Cu ternary alloy thin-film of the present invention may include the step of forming a ground layer subsequent to the above-described pretreatment step. The step of forming the ground layer is effective when the base material is made of a such a material as SUS or iron, which has low adhesion to the Sn—Ag—Cu ternary alloy thin-film. Regarding the present invention, the description "an Sn—Ag—Cu ternary alloy thin-film is formed entirely or partially on a base material" is given even when the ground layer is formed as such. In this respect, the ground layer may be regarded as the base material itself as long as the ground layer is made of a metal.

When the base material is SUS, for example, the ground layer may be formed by electroplating with Ni to a thickness of 0.1 to 5 µm, preferably 0.5 to 3 µm. When the base material is brass, the ground layer may be formed by electroplating with Ni or Cu to a thickness substantially as described above.

The formation of the ground layer is effective, especially when the base material is made of brass, in preventing Zn included in the brass from diffusing into the Sn—Ag—Cu ternary alloy thin-film and suppressing the solderability.

<Step of Forming Sn—Ag—Cu Ternary Alloy Thin-Film>

An Sn—Ag—Cu ternary alloy thin-film can be formed by electroplating entirely or partially on the base material directly or after the pretreatment step and/or the step of forming the ground layer as described above.

The electroplating may be performed under the conditions that a plating bath (containing 50 to 450 g/l, preferably 150 to 350 g/l of an Sn compound, 0.1 to 100 g/l, preferably 1 to 50 g/l of an Ag compound, 0.1 to 100 g/l, preferably 1 to 50 g/l of a Cu compound, 10 to 500 g/l, preferably 100 to 300 g/l of an inorganic chelating agent, 10 to 500 g/l, preferably 100 to 300 g/l of an organic chelating agent, and other additives) is used, the liquid temperature is 10 to 80° C., preferably 20 to 40° C. and the current density is 0.1 to 30 $A/dm^2$, preferably 2 to 25 $A/dm^2$. In the plating bath as described above, preferably Sn, an Sn alloy or an insoluble plate is used as an anode. It is particularly preferable to use the insoluble electrode.

While a plating apparatus used for performing the above-described electroplating is not specifically limited, it is preferable to use, for example, a barrel plating apparatus, a rack plating apparatus or a continuous plating apparatus. The Sn—Ag—Cu ternary alloy thin-film of the present invention can be manufactured with extremely high efficiency by using any of these apparatus.

Here, the barrel plating apparatus refers to an apparatus for individually plating workpieces to be plated on a one-by-one basis, and the continuous plating apparatus refers to an apparatus for continuously plating a plurality of workpieces to be plated, at a time. The rack plating apparatus is the one having an intermediate property relative to the aforementioned two apparatuses, and has a medium scale manufacturing efficiency. These apparatuses are well-known in the plating industry, and any of the apparatuses may be used as long as the structure itself of the apparatus is known.

<Article>

An article of the present invention may be an article having an Sn—Ag—Cu ternary alloy thin-film formed on a base material by the above-described method. The article may be any of connector, relay, slide switch, resistor, capacitor, coil, and substrate.

Such an article as described above includes, for example, those providing electrical conduction by soldering or those providing electrical conduction by contact so that the article can perform intended functions of the article as a part or a product. Such an article can be suitably used in those uses in which high corrosion resistance and stability of appearance properties are required.

Further, such an article as described above includes a circuit (interconnect portion) of a circuit board, a flexible substrate, a bump, and a via hole for example as well as a flat cable, an electrical wire, a lead of a solar cell for example.

The article of the present invention can be used highly effectively for semiconductor products, electrical products, electronic products, solar cells and automobiles, for example.

EXAMPLES

In the following, the present invention is described in more detail with reference to Examples. The prevent invention, however, is not limited to them.

Example 1

First, as a base material, a tape-shaped phosphor bronze that was an electrically conductive base rolled to have a thickness of 0.3 mm and a width of 30 mm was pressed into the shape of a connector so that it is the shape of continuous connector terminals, then cut to have a length of 100 m and taken up on a reel. The reel was then set on a feeding-out shaft of a continuous plating apparatus.

Next, the first washing was performed by continuously immersing the base material for 1 minute in an immersion bath of the continuous plating apparatus filled with an aqueous solution containing sodium hydroxide (using 50 g/l of Ace Clean 30 (produced by Okuno Chemical Industries Co., Ltd.), pH 12.5) at a liquid temperature of 48° C. Thereafter, washing with water was performed several times.

Subsequently, the second washing was performed by performing electrolysis in an electrolytic bath of the continuous plating apparatus having an alkaline pH (using 100 g/l of NC Rustol (produced by Okuno Chemical Industries Co., Ltd.) as an aqueous solution of sodium hydroxide, pH 13.2), using the base material subjected to the first washing as a cathode under the conditions of a liquid temperature of 50° C. and a current density of 5 A/dm$^2$ for 1 minute, and then washing with water was again repeated 5 times.

Next, the acid treatment with an acid for allowing the acid to act on the surface of the base material was performed by immersing the base material washed as such in an activation bath filled with sulfuric acid having a pH of 0.5 at a liquid temperature of 30° C. for 1 minute. Thereafter, washing with water was repeated 3 times.

Then, the step of forming a ground layer was performed to form the ground layer made of Ni for the base material processed as described above. Specifically, a plating bath of the continuous plating apparatus was filled with an Ni plating solution (containing 240 g/l of nickel sulfate, 45 g/l of nickel chloride and 40 g/l of boric acid), and electroplating under the conditions of a liquid temperature of 55° C., pH 3.8 and a current density of 4 A/dm$^2$ was performed for 5 minutes to form the ground layer of Ni. Thereafter, washing with water was performed 3 times.

Subsequently, the step of forming an Sn—Ag—Cu ternary alloy thin-film on the whole surface of the base material (the ground layer) was performed by electroplating the base material having the ground layer formed as described above. Specifically, the base material having the ground layer as formed was used as a cathode while an electrode made of Ti and having its surface coated with Pt was used as an anode, and a plating bath of the continuous plating apparatus was filled with 250 g/l of an Sn compound (tin (Sn) methanesulfonate), 25 g/l of an Ag compound (silver (Ag) methanesulfonate), 8 g/l of a Cu compound (copper (Cu) methanesulfonate), 250 g/l (10 parts by mass relative to 1 part by mass of the Ag compound) of a polymerized phosphate-based chelating agent (potassium polyphosphate $(KH)_{n+2}P_nO^{3n+1}$, molecular weight: 57.1+80n, n=5-11) as an inorganic chelating agent, 80 g/l (10 parts by mass relative to 1 part by mass of the Cu compound) of a porphyrin (tetranaphtyl porphyrin) as an organic chelating agent, and 30 cc/l of an additive (polyethylene glycol) to perform electroplating under the conditions of a liquid temperature of 30° C., pH 0.5 and a current density of 9 A/dm$^2$ for 2 minutes to form the Sn—Ag—Cu ternary alloy thin-film on the entire surface of the base material. After this, washing with water was performed 4 times, and drip-drying with air and drying with hot air of 70° C. for 2 minutes were performed to obtain an article of the present invention that is a connector having the Sn—Ag—Cu ternary alloy thin-film formed on the base material.

For the article obtained as such, samples were taken at points of 10 m and 90 m from an end thereof, and cross sections thereof were cut using an FIB (Focused Ion Beam) apparatus to measure the thicknesses thereof. As a result, the ground layer of Ni had a thickness of 1.1 μm and the Sn—Ag—Cu ternary alloy thin-film had a thickness of 3.5 μm. Further, the thickness of the Sn—Ag—Cu ternary alloy thin-film was extremely uniform.

In addition, the alloy ratio of the Sn—Ag—Cu ternary alloy thin-film measured using an EPMA (Electron Probe Micro-Analyzer) was 93.5 mass % of Sn, 5.0 mass % of Ag and 1.5 mass % of Cu. The melting point of the Sn—Ag—Cu ternary alloy thin-film was 227° C. and thus good solderability (low melting point) was shown. Further, the Sn—Ag—Cu ternary alloy thin-film was formed to have a fine granular crystalline state (particle size: 1 to 3 μm) as compared with a thin film made of Sn alone.

Generation of a whisker was not observed even when the Sn—Ag—Cu ternary alloy thin-film was kept in a high temperature and high humidity bath (60° C., 90% humidity) for 2000 hours. That is, the Sn—Ag—Cu ternary alloy thin-film simultaneously achieving the prevention of whisker generation and the good solderability (namely low melting point) could be obtained.

Example 2

An article of the present invention having an Sn—Ag—Cu ternary alloy thin-film formed on a base material was obtained in an exactly similar manner to that of Example 1 except that, instead of the plating bath for forming the Sn—Ag—Cu ternary alloy thin-film as used in Example 1, a plating bath was used that contained 250 gA of an Sn compound (tin (Sn) p-toluenesulfonate), 24 g/l of an Ag compound (silver (Ag) p-toluenesulfonate), 9 g/l of a Cu compound (copper (Cu) p-toluenesulfonate), 240 g/l (10 parts by mass relative to 1 part by mass of the Ag compound) of a polymerized phosphate-based chelating agent (sodium polyphosphate ($Na_5O_{10}P_3$)) as an inorganic chelating agent, 90 g/l (10 parts by mass relative to 1 part by mass of the Cu compound) of a porphyrin (sodium copper chlorophyllin ($C_{34}H_{31}CuN_4Na_3O_6$)) as an organic chelating agent, and 30 cc/l of an additive (polyethylene glycol).

For the article obtained as such, samples were taken at points of 10 m and 90 m from an end thereof, and cross sections thereof were cut using the FIB apparatus to measure the thicknesses thereof. As a result, the ground layer made of Ni had a thickness of 1.1 μm and the Sn—Ag—Cu ternary alloy thin-film had a thickness of 3.5 μm. Furthermore, the thickness of the Sn—Ag—Cu ternary alloy thin-film was extremely uniform.

In addition, the alloy ratio of the Sn—Ag—Cu ternary alloy thin-film measured using the EPMA was 93.6 mass % of Sn, 4.7 mass % of Ag and 1.7 mass % of Cu. The melting point of the Sn—Ag—Cu ternary alloy thin-film was 217° C. and thus good solderability was shown. Moreover, the Sn—Ag—

Cu ternary alloy thin-film was formed to have a fine granular crystalline state (particle size: 1 to 3 μm) as compared with a thin film made of Sn alone.

Generation of a whisker was not observed even when the Sn—Ag—Cu ternary alloy thin-film was kept in a high temperature and high humidity bath (60° C., 90% humidity) for 2000 hours. That is, the Sn—Ag—Cu ternary alloy thin-film simultaneously achieving the prevention of whisker generation and the good solderability (namely low melting point) could be obtained.

Example 3

An article of the present invention having an Sn—Ag—Cu ternary alloy thin-film formed on a base material was obtained in an exactly similar manner to that of Example 1 except that, instead of the plating bath for forming the Sn—Ag—Cu ternary alloy thin-film as used in Example 1, a plating bath was used that contained 260 g/l of an Sn compound (tin (Sn) p-phenolsulfonate), 10 g/l of an Ag compound (silver (Ag) p-phenolsulfonate), 2.5 g/l of a Cu compound (copper (Cu) p-phenolsulfonate), 100 gA (10 parts by mass relative to 1 part by mass of the Ag compound) of a polymerized phosphate-based chelating agent (potassium metaphosphate ($KO_3P$)) as an inorganic chelating agent, 25 g/l (10 parts by mass relative to 1 part by mass of the Cu compound) of a porphyrin (tetraphenyl porphyrin ($C_{44}H_{30}N_4$)) as an organic chelating agent, and 30 cc/l of an additive (polyethylene glycol).

For the article obtained as such, samples were taken at points of 10 m and 90 m from an end thereof, and cross sections thereof were cut using the FIB apparatus to measure the thicknesses thereof. As a result, the ground layer made of Ni had a thickness of 1.1 μm and the Sn—Ag—Cu ternary alloy thin-film had a thickness of 3.5 μm. Further, the thickness of the Sn—Ag—Cu ternary alloy thin-film was extremely uniform.

In addition, the alloy ratio of the Sn—Ag—Cu ternary alloy thin-film measured using the EPMA was 96 mass % of Sn, 3.6 mass % of Ag and 0.4 mass % of Cu. The melting point of the Sn—Ag—Cu ternary alloy thin-film was 215° C. and thus good solderability was shown. Further, the Sn—Ag—Cu ternary alloy thin-film was formed in a fine granular crystalline state (particle size: 1 to 3 μm) as compared with a thin film made of Sn alone.

Generation of a whisker was not observed even when the Sn—Ag—Cu ternary alloy thin-film was kept in a high temperature and high humidity bath (60° C., 90% humidity) for 2000 hours. That is, the Sn—Ag—Cu ternary alloy thin-film simultaneously achieving the prevention of whisker generation and the good solderability (namely low melting point) could be formed.

Example 4

An Sn—Ag—Cu ternary alloy thin-film was formed on a base material in an exactly similar manner to that of Example 1 except that, in the plating bath for forming the Sn—Ag—Cu ternary alloy thin-film as used in Example 1, the ratio of the inorganic chelating agent to 1 part by mass of the Ag compound was changed to 1 part by mass, 50 parts by mass, 100 parts by mass and 300 parts by mass.

In any of respective plating baths with different ratios of the inorganic chelating agent, isolation and precipitation of Ag and Cu out of the plating bath did not occur and aggregation of the inorganic chelating agent and the organic chelating agent did not occur as well. Thus, on the base material, the Sn—Ag—Cu ternary alloy thin-film similar to that of Example 1 could be formed.

Example 5

An Sn—Ag—Cu ternary alloy thin-film was formed on a base material in an exactly similar manner to that of Example 1 except that, in the plating bath for forming the Sn—Ag—Cu ternary alloy thin-film as used in Example 1, the ratio of the organic chelating agent to 1 part by mass of the Cu compound was changed to 1 part by mass, 50 parts by mass, 100 parts by mass and 200 parts by mass.

In any of respective plating baths with different ratios of the organic chelating agent, isolation and precipitation of Ag and Cu out of the plating bath did not occur and aggregation of the inorganic chelating agent and the organic chelating agent did not occur as well. Thus, on the base material, the Sn—Ag—Cu ternary alloy thin-film similar to that of Example 1 could be formed.

Comparative Example 1

An article was obtained by forming an Sn—Ag binary alloy thin-film on a base material in an exactly similar manner to that of Example 1 except that, instead of the plating bath for forming the Sn—Ag—Cu ternary alloy thin-film as used in Example 1, a plating bath was used that did not contain the Cu compound and the organic chelating agent (250 g/l of an Sn compound (tin (Sn) methanesulfonate), 25 g/l of an Ag compound (silver (Ag) methanesulfonate), 250 g/l (10 parts by mass relative to 1 part by mass of the Ag compound) of an inorganic chelating agent (potassium polyphosphate ($KH_{n+2}P_nO_{3n+1}$, molecular weight: 57.1+80n, n=5-11), and 30 cc/l of an additive (polyethylene glycol)).

For the article obtained as such, samples were taken at points of 10 m and 90 m from an end thereof, and cross sections thereof were cut using the FIB apparatus to measure the thicknesses thereof. As a result, the ground layer made of Ni had a thickness of 1.1 μm and the Sn—Ag binary alloy thin-film had a thickness of 3.5 μm.

In addition, the alloy ratio of the Sn—Ag binary alloy thin-film measured using the EPMA was 96.5 mass % of Sn and 3.5 mass % of Ag. The melting point of the Sn—Ag binary alloy thin-film was 227° C.

Although the Sn—Ag binary alloy thin-film had the same melting point as that of the Sn—Ag—Cu ternary alloy thin-film of Example 1, the whisker was generated when it was kept in a high temperature and high humidity bath (60° C., 90% humidity) for 2000 hours. In other words, in the article having such a binary alloy thin-film formed on the base material, the whisker was generated and thus the prevention of whisker generation and the good solderability (namely low melting point) could not be achieved simultaneously.

Comparative Example 2

An article was obtained by forming an Sn—Cu binary alloy thin-film on a base material in an exactly similar manner to that of Example 1 except that, instead of the plating bath for forming the Sn—Ag—Cu ternary alloy thin-film as used in Example 1, a plating bath was used that did not contain the Ag compound and the inorganic chelating agent (250 g/l of an Sn compound (tin (Sn) methanesulfonate), 8 g/l of a Cu compound (copper (Cu) methanesulfonate), 80 g/l (10 parts by mass relative to 1 part by mass of the Cu compound) of an organic chelating agent (tetranaphthyl porphyrin), and 30 cc/l of an additive (polyethylene glycol)).

For the article obtained as such, samples were taken at points of 10 m and 90 m from an end thereof, and cross sections thereof were cut using the FIB apparatus to measure the thicknesses thereof. As a result, the ground layer made of Ni had a thickness of 1.1 μm and the Sn—Cu binary alloy thin-film had a thickness of 3.5 μm.

In addition, the alloy ratio of the Sn—Cu binary alloy thin-film measured using the EPMA was 99.3 mass % of Sn and 0.7 mass % of Cu. The melting point of the Sn—Cu binary alloy thin-film was 227° C.

Although the Sn—Cu binary alloy thin-film had the same melting point as that of the Sn—Ag—Cu ternary alloy thin-film of Example 1, the whisker was generated when it was kept in a high temperature and high humidity bath (60° C., 90% humidity) for 300 hours. In other words, in the article having such a binary alloy thin-film formed on the base material, the whisker was generated and thus the prevention of whisker generation and the good solderability (namely low melting point) could not be achieved simultaneously.

Comparative Example 3

An article was obtained by forming an Sn—Ag binary alloy thin-film on a base material in an exactly similar manner to that of Example 1 except that, instead of the plating bath for forming the Sn—Ag—Cu ternary alloy thin-film as used in Example 2, a plating bath was used that did not contain the Cu compound and the organic chelating agent (250 g/l of an Sn compound (tin (Sn) p-toluenesulfonate), 24 g/l of an Ag compound (silver (Ag) p-toluenesulfonate), 240 g/l (10 parts by mass relative to 1 part by mass of the Ag compound) of an inorganic chelating agent (sodium polyphosphate ($Na_5O_{10}P_3$)), and 30 cc/l of an additive (polyethylene glycol)).

For the article obtained as such, samples were taken at points of 10 m and 90 m from an end thereof, and cross sections thereof were cut using the FIB apparatus to measure the thicknesses thereof. As a result, the ground layer made of Ni had a thickness of 1.1 μm and the Sn—Ag binary alloy thin-film had a thickness of 3.5 μm.

In addition, the alloy ratio of the Sn—Ag binary alloy thin-film measured using the EPMA was 93.6 mass % of Sn and 6.4 mass % of Ag. The melting point of the Sn—Ag binary alloy thin-film was 257° C.

In spite of the fact that the Sn—Ag binary alloy thin-film had the same Sn content as that of the Sn—Ag—Cu ternary alloy thin-film of Example 2, the binary alloy thin-film had the melting point higher by as large as 40° C. and thus was inferior in solderability.

Comparative Example 4

An article was obtained by forming an Sn—Cu binary alloy thin-film on a base material in an exactly similar manner to that of Example 1 except that, instead of the plating bath for forming the Sn—Ag—Cu ternary alloy thin-film as used in Example 2, a plating bath was used that did not contain the Ag compound and the inorganic chelating agent (250 g/l of an Sn compound (tin (Sn) p-toluenesulfonate), 9 g/l of a Cu compound (copper (Cu) p-toluenesulfonate), 90 g/l (10 parts by mass relative to 1 part by mass of the Cu compound) of an organic chelating agent (sodium copper chlorophyllin ($C_{34}H_{31}CuN_4Na_3O_6$)), and 30 cc/l of an additive (polyethylene glycol)).

For the article obtained as such, samples were taken at points of 10 m and 90 m from an end thereof, and cross sections thereof were cut using the FIB apparatus to measure the thicknesses thereof. As a result, the ground layer made of Ni had a thickness of 1.1 μm and the Sn—Cu binary alloy thin-film had a thickness of 3.5 μm.

In addition, the alloy ratio of the Sn—Cu binary alloy thin-film measured using the EPMA was 93.6 mass % of Sn and 6.4 mass % of Cu. The melting point of this surface layer was 287° C.

In spite of the fact that the Sn—Cu binary alloy thin-film had the same Sn content as that of the Sn—Ag—Cu ternary alloy thin-film of Example 2, the binary alloy thin-film had the melting point higher by as large as 70° C. and thus was inferior in solderability.

Comparative Example 5

For the same base material as used in Example 1, an Sn—Ag—Cu ternary alloy thin-film was formed on the base material by melting solder of an ingot of an Sn—Ag—Cu ternary alloy having the same composition as that of the Sn—Ag—Cu ternary alloy thin-film formed in Example 1.

The Sn—Ag—Cu ternary alloy thin-film had a thickness of no less than 100 μm, and the thickness was extremely uneven. In contrast, when the Sn—Ag—Cu ternary alloy thin-film was formed to have a thickness of no more than 100 μm, many pinholes were generated and thus the ternary alloy thin-film was inferior in corrosion resistance.

Comparative Example 6

An Sn—Ag—Cu ternary alloy thin-film was formed on a base material in an exactly similar manner to that of Example 1, except that the inorganic chelating agent was not contained in the plating bath for forming the Sn—Ag—Cu ternary alloy thin-film as used in Example 1.

In the plating bath, however, isolation and precipitation of Ag out of the plating bath occurred noticeably, and thus a desired Sn—Ag—Cu ternary alloy thin-film could not be formed on the base material.

Comparative Example 7

An Sn—Ag—Cu ternary alloy thin-film was formed on a base material in an exactly similar manner to that of Example 1, except that, in the plating bath for forming the Sn—Ag—Cu ternary alloy thin-film as used in Example 1, the ratio of the inorganic chelating agent to 1 part by mass of the Ag compound was changed to 0.5 parts by mass.

In the plating bath, however, isolation and precipitation of Ag out of the plating bath occurred, and thus a desired Sn—Ag—Cu ternary alloy thin-film could not be formed on the base material.

Comparative Example 8

An Sn—Ag—Cu ternary alloy thin-film was formed on a base material in an exactly similar manner to that of Example 1, except that, in the plating bath for forming the Sn—Ag—Cu ternary alloy thin-film as used in Example 1, the ratio of the inorganic chelating agent to 1 part by mass of the Ag compound was changed to 400 parts by mass.

In the plating bath, however, aggregation of the inorganic chelating agent and the organic chelating agent occurred and isolation and precipitation of Ag and Cu occurred as well, and thus a desired Sn—Ag—Cu ternary alloy thin-film could not be formed on the base material.

Comparative Example 9

An Sn—Ag—Cu ternary alloy thin-film was formed on a base material in an exactly similar manner to that of Example 1, except that the organic chelating agent was not contained in the plating bath for forming the Sn—Ag—Cu ternary alloy thin-film as used in Example 1.

In the plating bath, however, isolation and precipitation of Cu out of the plating bath occurred noticeably, and thus a desired Sn—Ag—Cu ternary alloy thin-film could not be formed on the base material.

Comparative Example 10

An Sn—Ag—Cu ternary alloy thin-film was formed on a base material in an exactly similar manner to that of Example 1, except that, in the plating bath for forming the Sn—Ag—Cu ternary alloy thin-film as used in Example 1, the ratio of the organic chelating agent to 1 part by mass of the Cu compound was changed to 0.5 parts by mass.

In the plating bath, however, isolation and precipitation of Cu out of the plating bath occurred, and thus a desired Sn—Ag—Cu ternary alloy thin-film could not be formed on the base material.

Comparative Example 11

An Sn—Ag—Cu ternary alloy thin-film was formed on a base material in an exactly similar manner to that of Example 1, except that, in the plating bath for forming the Sn—Ag—Cu ternary alloy thin-film as used in Example 1, the ratio of the organic chelating agent to 1 part by mass of the Cu compound was changed to 300 parts by mass.

In the plating bath, however, aggregation of the inorganic chelating agent and the organic chelating agent occurred and isolation and precipitation of Ag and Cu occurred as well, and thus a desired Sn—Ag—Cu ternary alloy thin-film could not be formed on the base material.

Example 6

First, as a base material, a tape-shaped copper that was an electrically conductive base rolled to have a thickness of 0.3 mm and a width of 30 mm was pressed into the shape of a connector so that it is the shape of continuous connector terminals, then cut to have a length of 100 m and taken up on a reel. The reel was then set on a feeding-out shaft of a continuous plating apparatus.

Next, the first washing was performed by continuously immersing the base material for 1 minute in an immersion bath of the continuous plating apparatus that was filled with an aqueous solution containing sodium hydroxide (using 50 g/l of Ace Clean 30 (produced by Okuno Chemical Industries Co., Ltd.), pH 12.5) at a liquid temperature of 48° C. Thereafter, washing with water was performed several times.

Subsequently, the second washing was performed by performing electrolysis in an electrolytic bath of the continuous plating apparatus having an alkaline pH (using 100 g/l of NC Rustol (produced by Okuno Chemical Industries Co., Ltd.) as an aqueous solution of sodium hydroxide, pH 13.2) using the base material subjected to the first washing as a cathode under the conditions of a liquid temperature of 50° C. and a current density of 5 A/dm$^2$ for 1 minute, and then washing with water was again repeated 5 times.

Next, the acid treatment with an acid for allowing the acid to act on the surface of the conductive base was performed by immersing the base material washed as such in an activation bath filled with sulfuric acid having a pH of 0.5 at a liquid temperature of 30° C. for 1 minute. Thereafter, washing with water was repeated 3 times.

Then, on the base material having been processed as described above, the step of forming an Sn layer made of Sn by electroplating was performed. Specifically, the base material having been processed as described above was immersed in a plating bath of the continuous plating apparatus, the base material itself was used as a cathode while Sn was used as an anode, and the plating bath of the continuous plating apparatus was filled with 350 g/l of tin (Sn) methanesulfonate and 50 cc/l of an additive (trade name: Metasu SBS (produced by Yuken Industry Co., Ltd.)) to perform electroplating under the conditions of a liquid temperature of 35° C., pH 0.5 and a current density of 4 A/dm$^2$ for 2 minutes to obtain the base material having the Sn layer formed on the conductive base.

Subsequently, the step of forming an Sn—Ag—Cu ternary alloy thin-film on the Sn layer was performed by still immersing the base material having the Sn layer formed as described above in the plating bath of the continuous plating apparatus so as to perform electroplating. Specifically, the base material having the Sn layer formed thereon was used as a cathode while an electrode made of Ti having its surface coated with Pt was used as an anode, and the plating bath of the continuous plating apparatus was filled with 260 g/l of an Sn compound (tin (Sn) methanesulfonate), 10 g/l of an Ag compound (silver (Ag) methanesulfonate), 2.5 g/l of a Cu compound (copper (Cu) methanesulfonate), 100 g/l (10 parts by mass relative to 1 part by mass of the Ag compound) of a polymerized phosphate-based chelating agent (potassium polyphosphate $(KH)_{n+2}P_nO_{3n+1}$, molecular weight: 57.1+80n, n=5-11) as an inorganic chelating agent, 25 g/l (10 parts by mass relative to 1 part by mass of the Cu compound) of a porphyrin (tetranaphtyl porphyrin) as an organic chelating agent, and 30 ccA of an additive (polyethylene glycol) to perform electroplating under the conditions of a liquid temperature of 30° C., pH 0.5 and a current density of 4 A/dm$^2$ for 0.5 minutes to form the Sn—Ag—Cu ternary alloy thin-film on the Sn layer. After this, washing with water was performed 4 times, and drip-drying with air and drying with hot air of 70° C. for 2 minutes were performed. Thus, with the base material having the Sn layer thus formed on the conductive base, an article of the present invention was obtained having the Sn—Ag—Cu ternary alloy thin-film formed on the Sn layer.

For the article obtained as such, samples were taken at points of 10 m and 90 m from an end thereof, and cross sections thereof were cut using the FIB apparatus to measure the thicknesses thereof. As a result, the Sn layer had a thickness of 4 μm and the Sn—Ag—Cu ternary alloy thin-film had a thickness of 1 μm and the thickness was uniform.

In addition, the alloy ratio of the Sn—Ag—Cu ternary alloy thin-film measured using the EPMA was 96 mass % of Sn, 3.6 mass % of Ag and 0.4 mass % of Cu. The melting point of the Sn—Ag—Cu ternary alloy thin-film was 215° C. and thus good solderability was shown. Further, the Sn—Ag—Cu ternary alloy thin-film was formed to have a fine granular crystalline state (particle size: 1 to 3 μm) as compared with a thin film made of Sn alone.

Furthermore, generation of a whisker was not observed even when the Sn—Ag—Cu ternary alloy thin-film was kept in a high temperature and high humidity bath (60° C., 90% humidity) for 2000 hours. That is, the Sn—Ag—Cu ternary alloy thin-film simultaneously achieving the prevention of whisker generation and the good solderability (namely low melting point) could be obtained.

Example 7

First, as a base material, a tape-shaped phosphor bronze that was an electrically conductive base rolled to have a thickness of 0.3 mm and a width of 30 mm was pressed into the shape of a connector so that it is the shape of a large number of continuous connector terminals, then cut to have a length of 100 m and taken up on a reel. The reel was then set on a feeding-out shaft of a continuous plating apparatus.

Next, the first washing was performed by continuously immersing the base material for 1 minute in an immersion bath of the continuous plating apparatus that was filled with an aqueous solution containing sodium hydroxide (using 50 g/l of Ace Clean 30 (produced by Okuno Chemical Industries Co., Ltd.), pH 12.5) at a liquid temperature of 48° C. Thereafter, washing with water was performed several times.

Subsequently, the second washing was performed by performing electrolysis in an electrolytic bath of the continuous plating apparatus having an alkaline pH (using 100 g/l of NC Rustol (produced by Okuno Chemical Industries Co., Ltd.) as an aqueous solution of sodium hydroxide, pH 13.2) using the base material subjected to the first washing as a cathode under the conditions of a liquid temperature of 50° C. and a current density of 5 A/dm$^2$ for 1 minute, and then washing with water was again repeated 5 times.

Next, the acid treatment with an acid for allowing the acid to act on the surface of the base material was performed by immersing the base material washed as such in an activation bath filled with sulfuric acid having a pH of 0.5 at a liquid temperature of 30° C. for 1 minute. Thereafter, washing with water was repeated 3 times.

Then, the step of forming a ground layer was performed to form the ground layer made of Ni for the base material processed as described above. Specifically, a plating bath of the continuous plating apparatus was filled with an Ni plating solution (containing 240 g/l of nickel sulfate, 45 g/l of nickel chloride and 40 g/l of boric acid), and electroplating was performed for 5 minutes under the conditions of a liquid temperature of 55° C., pH 3.8 and a current density of 4 A/dm$^2$ to form the ground layer of Ni. Thereafter, washing with water was performed 3 times.

Subsequently, with the base material having the ground layer formed as described above, the step of forming an Sn—Ag—Cu ternary alloy thin-film by electroplating on the whole surface of the base material (the ground layer) was performed. Specifically, the base material having the ground layer as formed was used as a cathode while an electrode made of Ti having its surface coated with Pt was used as an anode, and a plating bath of the continuous plating apparatus was filled with 250 g/l of an Sn compound (tin (Sn) methanesulfonate), 25 g/l of an Ag compound (silver (Ag) methanesulfonate), 8 g/l of a Cu compound (copper (Cu) methanesulfonate), 250 g/l (10 parts by mass relative to 1 part by mass of the Ag compound) of an inorganic chelating agent (TiF$_6^{2-}$: metal fluoro complex-based chelating agent represented by chemical formula (I) indicated above), 80 g/l (10 parts by mass relative to 1 part by mass of the Cu compound) of an organic chelating agent (5,10,15,20-tetraazaporphyrin which is one of porphyrins), and additives (30 cc/l of polyethylene glycol, 100 g/l of methanesulfonic acid, 20 g/l of boric acid), and electroplating was performed for 2 minutes under the conditions of a liquid temperature of 28° C., pH 0.5 and a current density of 9 A/dm$^2$. Accordingly the Sn—Ag—Cu ternary alloy thin-film was formed on the whole surface of the base material. After this, washing with water was performed 4 times, and drip-drying with air and drying with hot air of 70° C. for 2 minutes were performed. In this way, an article of the present invention was obtained that was a connector having the Sn—Ag—Cu ternary alloy thin-film formed on the base material.

For the article obtained as such, samples were taken at points of 10 m and 90 m from an end thereof, and cross sections thereof were cut using the FIB (Focused Ion Beam) apparatus to measure the thicknesses thereof. As a result, the ground layer of Ni had a thickness of 1.1 μm and the Sn—Ag—Cu ternary alloy thin-film had a thickness of 4.1 μm. Further, the thickness of the Sn—Ag—Cu ternary alloy thin-film was extremely uniform.

In addition, the alloy ratio of the Sn—Ag—Cu ternary alloy thin-film measured using the EPMA (Electron Probe Micro-Analyzer) was substantially uniform in the thin film that was 93.3 mass % of Sn, 5.2 mass % of Ag and 1.5 mass % of Cu. The melting point of the Sn—Ag—Cu ternary alloy thin-film was 227° C. and thus good solderability (low melting point) was shown. Further, the Sn—Ag—Cu ternary alloy thin-film was formed to have a fine granular crystalline state (particle size: 0.5 to 1.5 μm) as compared with a thin film made of Sn alone.

Furthermore, generation of a whisker was not observed even when the Sn—Ag—Cu ternary alloy thin-film was kept in a high temperature and high humidity bath (60° C., 90% humidity) for 2000 hours. That is, the Sn—Ag—Cu ternary alloy thin-film simultaneously achieving the prevention of whisker generation and the good solderability (namely low melting point) could be obtained.

Examples 8 to 12

Articles (Examples 8 to 12) of the present invention each having an Sn—Ag—Cu ternary alloy thin-film formed on a base material were obtained in an exactly similar manner to that of Example 7 except that a plating bath having the composition shown in Table 1 below was used instead of the plating bath for forming the Sn—Ag—Cu ternary alloy thin-film as used in Example 7. While additives that were 30 cc/l of polyethylene glycol, 100 g/l of an organic acid (dissociated to release the same anions as those contained in the Sn compound, Ag compound and Cu compound of each Example) and 20 g/l of boric acid were contained, they are not indicated in Table 1.

For each of the articles obtained as such, samples were taken at points of 10 m and 90 m from an end thereof, and cross sections thereof were cut using the FIB apparatus to measure the thicknesses thereof. As a result, the ground layer made of Ni had a thickness of 1.1 μm and the Sn—Ag—Cu ternary alloy thin-film had a thickness as shown in Table 2 below. Further, the thickness of the Sn—Ag—Cu ternary alloy thin-film of the articles each was extremely uniform.

In addition, the alloy ratio of the Sn—Ag—Cu ternary alloy thin-films each measured using the EPMA was substantially uniform in each thin film that was the alloy ratio as shown in Table 2 below. The melting point of the Sn—Ag—Cu ternary alloy thin-films each was the one as shown in Table 2 and thus good solderability was shown. Further, the Sn—Ag—Cu ternary alloy thin-films each was formed to have a fine granular crystalline state (particle size: 0.5 to 1.5 μm) as compared with a thin film made of Sn alone.

Furthermore, generation of a whisker was not observed even when the Sn—Ag—Cu ternary alloy thin-films each of any of the articles was kept in a high temperature and high humidity bath (60° C., 90% humidity) for 2000 hours. That is, the Sn—Ag—Cu ternary alloy thin-film simultaneously achieving the prevention of whisker generation and the good solderability (namely low melting point) could be obtained.

TABLE 1

| Example | Sn compound (g/l) | Ag compound (g/l) | Cu compound (g/l) | inorganic chelating agent (g/l) | organic chelating agent (g/l) |
|---|---|---|---|---|---|
| 8 | tin (Sn) p-toluenesulfonate (250) | silver (Ag) p-toluenesulfonate (24) | copper (Cu) p-toluenesulfonate (8) | $SiF_6^{2-}$ (240) | 3,8,13,18-tetramethylporphyrin-2,7,12,17-tetrapropanoic acid (80) |
| 9 | tin (Sn) p-phenolsulfonate (260) | silver (Ag) p-phenolsulfonate (10) | copper (Cu) p-phenolsulfonate (2.5) | $SiF_6^{2-}$ (100) | 3-formyl-8-[(4E,8E)-1-hydroxy-5,9,13-trimethyltetradeca-4,8,12-trien-1-yl]-7,12,17-trimethyl-13-vinylporphyrin-2,18-dipropanoic acid (25) |
| 10 | tin (Sn) methanesulfonate (250) | silver (Ag) methanesulfonate (25) | copper (Cu) methanesulfonate (8) | $TiF_6^{2-}$ (250) | 3,8,13,18-tetrakis(carboxymethyl)porphyrin-2,7,12,17-tetrapropanoic acid (80) |
| 11 | tin (Sn) methanesulfonate (250) | silver (Ag) methanesulfonate (25) | copper (Cu) methanesulfonate (8) | $SiF_6^{2-}$ (250) | (17S,18S)-7,12-diethyl-$2^1,2^2$,17,18-tetrahydro-3,8,13,17-tetramethyl-$2^1$-oxocyclopenta[at]porphyrin-18-propionic acid (80) |
| 12 | tin (Sn) methanesulfonate (250) | silver (Ag) methanesulfonate (25) | copper (Cu) methanesulfonate (8) | $TiF_6^{2-}$ (250) | $2^1,2^2$,17,18-tetrahydrocyclopenta[at]porphyrin (80) |

TABLE 2

| | alloy ratio (mass %) | | | thickness of ternary alloy | melting point of ternary alloy |
|---|---|---|---|---|---|
| Example | Sn | Ag | Cu | thin film (μm) | thin film (° C.) |
| 8 | 93.4 | 5.3 | 1.3 | 3.7 | 227 |
| 9 | 95.8 | 3.4 | 0.8 | 3.5 | 215 |
| 10 | 93.6 | 5.2 | 1.2 | 3.7 | 227 |
| 11 | 93.0 | 5.1 | 1.9 | 3.2 | 228 |
| 12 | 93.3 | 5.0 | 1.7 | 3.6 | 227 |

Example 13

An Sn—Ag—Cu ternary alloy thin-film was formed on a base material in an exactly similar manner to that of Example 7 except that, in the plating bath for forming the Sn—Ag—Cu ternary alloy thin-film as used in Example 7, the ratio of the inorganic chelating agent to 1 part by mass of the Ag compound was changed to 1 part by mass, 50 parts by mass, 100 parts by mass and 300 parts by mass.

In any of respective plating baths having the different ratios of the inorganic chelating agent, isolation and precipitation of Ag and Cu out of the plating bath did not occur and aggregation of the inorganic chelating agent and the organic chelating agent did not occur as well. The Sn—Ag—Cu ternary alloy thin-film similar to that of Example 7 could thus be formed on the base material.

Example 14

An Sn—Ag—Cu ternary alloy thin-film was formed on a base material in an exactly similar manner to that of Example 7 except that, in the plating bath for forming the Sn—Ag—Cu ternary alloy thin-film as used in Example 7, the ratio of the organic chelating agent to 1 part by mass of the Cu compound was changed to 1 part by mass, 50 parts by mass, 100 parts by mass and 200 parts by mass.

In any of respective platin baths having the different ratios of the organic chelating agent, isolation and precipitation of Ag and Cu out of the plating bath did not occur and aggregation of the inorganic chelating agent and the organic chelating agent did not occur as well. The Sn—Ag—Cu ternary alloy thin-film similar to that of Example 7 could thus be formed on the base material.

Comparative Example 12

An article was obtained by forming an Sn—Ag binary alloy thin-film on a base material in an exactly similar manner to that of Example 7 except that, instead of the plating bath for forming the Sn—Ag—Cu ternary alloy thin-film as used in Example 7, a plating bath was used that did not contain the Cu compound and the organic chelating agent (250 g/l of an Sn compound (tin (Sn) methanesulfonate), 25 gA of an Ag compound (silver (Ag) methanesulfonate), 250 g/l (10 parts by mass relative to 1 part by mass of the Ag compound) of an inorganic chelating agent ($TiF_6^{2-}$: metal fluoro complex-based chelating agent represented by chemical formula (I) indicated above), and additives (30 cc/l of polyethylene glycol, 100 g/l of methanesulfonic acid, 20 g/l of boric acid)).

For the article obtained as such, samples were taken at points of 10 m and 90 m from an end thereof, and cross sections thereof were cut using the FIB apparatus to measure the thicknesses thereof. As a result, the ground layer made of Ni had a thickness of 1.1 μm and the Sn—Ag binary alloy thin-film had a thickness of 4.0 μm.

In addition, the alloy ratio of the Sn—Ag binary alloy thin-film measured using the EPMA was 96 mass % of Sn and 4 mass % of Ag. The melting point of the Sn—Ag binary alloy thin-film was 227° C.

Although the Sn—Ag binary alloy thin-film had the same melting point as that of the Sn—Ag—Cu ternary alloy thin-film of Example 7, a whisker (5 to 10 μm) was generated when it was kept in a high temperature and high humidity bath (60° C., 90% humidity) for 2000 hours. In other words, in the article having such a binary alloy thin-film formed on the base material, the whisker was generated and thus the prevention of whisker generation and the good solderability (namely low melting point) could not be achieved simultaneously.

Comparative Example 13

An article was obtained by forming an Sn—Cu binary alloy thin-film on a base material in an exactly similar manner to that of Example 7 except that, instead of the plating bath for forming the Sn—Ag—Cu ternary alloy thin-film as used in Example 7, a plating bath was used that did not contain the Ag compound and the inorganic chelating agent (250 g/l of an Sn compound (tin (Sn) methanesulfonate), 8 g/l of a Cu compound (copper (Cu) methanesulfonate), 80 g/l (10 parts by mass relative to 1 part by mass of the Cu compound) of an organic chelating agent (5,10,15,20-tetraazaporphyrin which is one of porphyrins), and additives (30 cc/l of polyethylene glycol, 100 g/l of methanesulfonic acid, 20 g/l of boric acid).

For the article obtained as such, samples were taken at points of 10 m and 90 m from an end thereof, and cross sections thereof were cut using the FIB apparatus to measure the thicknesses thereof. As a result, the ground layer made of Ni had a thickness of 1.1 μm and the Sn—Cu binary alloy thin-film had a thickness of 4.2 μm.

In addition, the alloy ratio of the Sn—Cu binary alloy thin-film measured using the EPMA was 99.3 mass % of Sn and 0.7 mass % of Cu. The melting point of the Sn—Cu binary alloy thin-film was 227° C.

Although the Sn—Cu binary alloy thin-film had the same melting point as that of the Sn—Ag—Cu ternary alloy thin-film of Example 7, a whisker (100 to 500 μm) was generated when it was kept in a high temperature and high humidity bath (60° C., 90% humidity) for 300 hours. In other words, in the article having such a binary alloy thin-film formed on the base material, the whisker was generated and thus the prevention of whisker generation and the good solderability (namely low melting point) could not be achieved simultaneously.

Comparative Example 14

An article was obtained by forming an Sn—Ag binary alloy thin-film on a base material in an exactly similar manner to that of Example 8 except that, instead of the plating bath for forming the Sn—Ag—Cu ternary alloy thin-film as used in Example 8, a plating bath was used that did not contain the Cu compound and the organic chelating agent (250 g/l of an Sn compound (tin (Sn) p-toluenesulfonate), 24 g/l of an Ag compound (silver (Ag) p-toluenesulfonate), 240 g/l (10 parts by mass relative to 1 part by mass of the Ag compound) of an inorganic chelating agent ($SiF_6^{2-}$: metal fluoro complex-based chelating agent represented by chemical formula (I) indicated above), and additives (30 cc/l of polyethylene glycol, 100 g/l of p-toluenesulfonic acid, 20 g/l of boric acid)).

For the article obtained as such, samples were taken at points of 10 m and 90 m from an end thereof, and cross sections thereof were cut using the FIB apparatus to measure the thicknesses thereof. As a result, the ground layer made of Ni had a thickness of 1; 1 μm and the Sn—Ag binary alloy thin-film had a thickness of 4.0 μm.

In addition, the alloy ratio of the Sn—Ag binary alloy thin-film measured using the EPMA was 93.4 mass % of Sn and 6.6 mass % of Ag. The melting point of the Sn—Ag binary alloy thin-film was 257° C.

In spite of the fact that the Sn—Ag binary alloy thin-film had the same Sn content as that of the Sn—Ag—Cu ternary alloy thin-film of Example 8, the binary alloy thin-film had the melting point higher by as large as 30° C. and thus was inferior in solderability.

Comparative Example 15

An article was obtained by forming an Sn—Cu binary alloy thin-film on a base material in an exactly similar manner to that of Example 8 except that, instead of the plating bath for forming the Sn—Ag—Cu ternary alloy thin-film as used in Example 8, a plating bath was used that did not contain the Ag compound and the inorganic chelating agent (250 g/l of an Sn compound (tin (Sn) p-toluenesulfonate), 8 g/l of a Cu compound (copper (Cu) p-toluenesulfonate), 80 g/l (10 parts by mass relative to 1 part by mass of the Cu compound) of an organic chelating agent (3,8,13,18-tetramethylporphyrin-2,7, 12,17-tetrapropanoic acid which is one of porphyrins), and additives (30 cc/l of polyethylene glycol, 100 g/l of p-toluenesulfonic acid, 20 g/l of boric acid)).

For the article obtained as such, samples were taken at points of 10 m and 90 m from an end thereof, and cross sections thereof were cut using the FIB apparatus to measure the thicknesses thereof. As a result, the ground layer made of Ni had a thickness of 1.1 μm and the Sn—Cu binary alloy thin-film had a thickness of 4.1 μm.

In addition, the alloy ratio of the Sn—Cu binary alloy thin-film measured using the EPMA was 93.4 mass % of Sn and 6.6 mass % of Cu. The melting point of this surface layer was 287° C.

In spite of the fact that the Sn—Cu binary alloy thin-film had the same Sn content as that of the Sn—Ag—Cu ternary alloy thin-film of Example 8, the binary alloy thin-film had the melting point higher by as large as 60° C. and thus was inferior in solderability. Further, when the Sn—Cu binary alloy thin-film was kept in a high temperature and high humidity bath (60° C., 90% humidity) for 2000 hours, a whisker (100 to 300 μm) was generated.

Comparative Example 16

For the base material as used in Example 7, an Sn—Ag—Cu ternary alloy thin-film was formed on the base material by melting solder of an ingot of an Sn—Ag—Cu ternary alloy having the same composition as that of the Sn—Ag—Cu ternary alloy thin-film formed in Example 7.

The Sn—Ag—Cu ternary alloy thin-film, however, had a thickness of no less than 100 μm, and the thickness was extremely uneven. In contrast, when the Sn—Ag—Cu ternary alloy thin-film was formed to have a thickness of no more than 100 μm, many pinholes were generated and thus the ternary alloy thin-film was inferior in corrosion resistance.

Comparative Example 17

An Sn—Ag—Cu ternary alloy thin-film was formed on a base material in an exactly similar manner to that of Example 7, except that the inorganic chelating agent was not contained in the plating bath for forming the Sn—Ag—Cu ternary alloy thin-film as used in Example 7.

In the plating bath, however, isolation and precipitation of Ag out of the plating bath occurred noticeably, and thus a desired Sn—Ag—Cu ternary alloy thin-film could not be formed on the base material.

Comparative Example 18

An Sn—Ag—Cu ternary alloy thin-film was formed on a base material in an exactly similar manner to that of Example 7, except that, in the plating bath for forming the Sn—Ag—Cu ternary alloy thin-film as used in Example 7, the ratio of the inorganic chelating agent to 1 part by mass of the Ag compound was changed to 0.5 parts by mass.

In the plating bath, however, isolation and precipitation of Ag out of the plating bath occurred, and thus a desired Sn—Ag—Cu ternary alloy thin-film could not be formed on the base material.

Comparative Example 19

An Sn—Ag—Cu ternary alloy thin-film was formed on a base material in an exactly similar manner to that of Example 7, except that, in the plating bath for forming the Sn—Ag—

Cu ternary alloy thin-film as used in Example 7, the ratio of the inorganic chelating agent to 1 part by mass of the Ag compound was changed to 400 parts by mass.

In the plating bath, however, aggregation of the inorganic chelating agent and the organic chelating agent occurred and isolation and precipitation of Ag and Cu occurred as well, and thus a desired Sn—Ag—Cu ternary alloy thin-film could not be formed on the base material.

Comparative Example 20

An Sn—Ag—Cu ternary alloy thin-film was formed on a base material in an exactly similar manner to that of Example 7, except that the organic chelating agent was not contained in the plating bath for forming the Sn—Ag—Cu ternary alloy thin-film as used in Example 7.

In the plating bath, however, isolation and precipitation of Cu out of the plating bath occurred noticeably, and thus a desired Sn—Ag—Cu ternary alloy thin-film could not be formed on the base material.

Comparative Example 21

An Sn—Ag—Cu ternary alloy thin-film was formed on a base material in an exactly similar manner to that of Example 7, except that, in the plating bath for forming the Sn—Ag—Cu ternary alloy thin-film as used in Example 7, the ratio of the organic chelating agent to 1 part by mass of the Cu compound was changed to 0.5 parts by mass.

In the plating bath, however, isolation and precipitation of Cu out of the plating bath occurred, and thus a desired Sn—Ag—Cu ternary alloy thin-film could not be formed on the base material.

Comparative Example 22

An Sn—Ag—Cu ternary alloy thin-film was formed on a base material in an exactly similar manner to that of Example 7, except that, in the plating bath for forming the Sn—Ag—Cu ternary alloy thin-film as used in Example 7, the ratio of the organic chelating agent to 1 part by mass of the Cu compound was changed to 300 parts by mass.

In the plating bath, however, aggregation of the inorganic chelating agent and the organic chelating agent occurred and isolation and precipitation of Ag and Cu occurred as well, and thus a desired Sn—Ag—Cu ternary alloy thin-film could not be formed on the base material.

Example 15

First, as a base material, a tape-shaped copper that was an electrically conductive base rolled to have a thickness of 0.3 mm and a width of 30 mm was pressed into the shape of a connector so that it is the shape of a large number of continuous connector terminals, then cut to have a length of 100 m and taken up on a reel. The reel was then set on a feeding-out shaft of a continuous plating apparatus.

Next, the first washing was performed by continuously immersing the base material for 1 minute in an immersion bath of the continuous plating apparatus that was filled with an aqueous solution containing sodium hydroxide (using 50 g/l of Ace Clean 30 (produced by Okuno Chemical Industries Co., Ltd.), pH 12.5) at a liquid temperature of 48° C. Thereafter, washing with water was performed several times.

Subsequently, the second washing was performed by performing electrolysis in an electrolytic bath of the continuous plating apparatus having an alkaline pH (using 100 g/l of NC Rustol (produced by Okuno Chemical Industries Co., Ltd.) as an aqueous solution of sodium hydroxide, pH 13.2) using the base material subjected to the first washing as a cathode under the conditions of a liquid temperature of 50° C. and a current density of 5 A/dm$^2$ for 1 minute, and then washing with water was again repeated 5 times.

Next, the acid treatment with an acid for allowing the acid to act on the surface of the conductive base was performed by immersing the base material washed as such in an activation bath filled with sulfuric acid having a pH of 0.5 at a liquid temperature of 30° C. for 1 minute. Thereafter, washing with water was repeated 3 times.

Then, on the base material having been processed as described above, the step of forming an Sn layer made of Sn by electroplating was performed. Specifically, the base material having been processed as described above was immersed in a plating bath of the continuous plating apparatus, the base material itself was used as a cathode while Sn was used as an anode, and the plating bath of the continuous plating apparatus was filled with 350 g/l of tin (Sn) methanesulfonate and 50 cc/l of an additive (trade name: Metasu SBS (produced by Yuken Industry Co., Ltd.)) to perform electroplating under the conditions of a liquid temperature of 35° C., pH 0.5 and a current density of 4 A/dm$^2$ for 2 minutes to obtain the base material having the Sn layer formed on the conductive base.

Subsequently, the step of forming an Sn—Ag—Cu ternary alloy thin-film on the Sn layer was performed by still immersing the base material having the Sn layer formed as described above in the plating bath of the continuous plating apparatus so as to perform electroplating. Specifically, the base material having the Sn layer as formed was used as a cathode while an electrode made of Ti having its surface coated with Pt was used as an anode, and the plating bath of the continuous plating apparatus was filled with 260 g/l of an Sn compound (tin (Sn) methanesulfonate), 10 g/l of an Ag compound (silver (Ag) methanesulfonate), 2.5 g/l of a Cu compound (copper (Cu) methanesulfonate), 100 g/l (10 parts by mass relative to 1 part by mass of the Ag compound) of an inorganic chelating agent (TiF$_6^{2-}$: metal fluoro complex-based chelating agent represented by chemical formula (I) indicated above), 25 g/l (10 parts by mass relative to 1 part by mass of the Cu compound) of an organic chelating agent (7,12-bis(1-hydroxyethyl)-3,8,13,17-tetramethylporphyrin-2,18-dipropanoic acid which is one of porphyrins), and additives (30 cc/l of polyethylene glycol, 100 g/l of methane sulfonic acid, 20 g/l of boric acid) to perform electroplating under the conditions of a liquid temperature of 30° C., pH 0.5 and a current density of 4.1 A/dm$^2$ for 1 minute to form the Sn—Ag—Cu ternary alloy thin-film on the Sn layer. After this, washing with water was performed 4 times, and drip-drying with air and drying with hot air of 70° C. for 2 minutes were performed. Thus, with the base material having the Sn layer formed on the conductive base, an article of the present invention was obtained having the Sn—Ag—Cu ternary alloy thin-film formed on the Sn layer.

For the article obtained as such, samples were taken at points of 10 m and 90 m from an end thereof, and cross sections thereof were cut using the FIB apparatus to measure the thicknesses thereof. As a result, the Sn layer had a thickness of 4 μm while the Sn—Ag—Cu ternary alloy thin-film had a thickness of 1.5 μm and the thickness was uniform.

In addition, the alloy ratio of the Sn—Ag—Cu ternary alloy thin-film measured using the EPMA was substantially uniform in the thin film and was 96.1 mass % of Sn, 3.5 mass % of Ag and 0.4 mass % of Cu. The melting point of the Sn—Ag—Cu ternary alloy thin-film was 215° C. and thus good solderability was shown. Further, the Sn—Ag—Cu ternary alloy thin-film was formed to have a fine granular crystalline state (particle size: 0.5 to 1.5 μm) as compared with a thin film made of Sn alone.

Furthermore, generation of a whisker was not observed even when the Sn—Ag—Cu ternary alloy thin-film was kept in a high temperature and high humidity bath (60° C., 90% humidity) for 2000 hours. That is, the Sn—Ag—Cu ternary alloy thin-film simultaneously achieving the prevention of whisker generation and the good solderability (namely low melting point) could be obtained.

Example 16

First, as a base material, a tape-shaped phosphor bronze that was an electrically conductive base rolled to have a thickness of 0.3 mm and a width of 30 mm was pressed into the shape of a connector so that it is the shape of a large number of continuous connector terminals, then cut to have a length of 100 m and taken up on a reel. The reel was then set on a feeding-out shaft of s continuous plating apparatus.

Next, the first washing was performed by continuously immersing the base material for 1 minute in an immersion bath of the continuous plating apparatus that was filled with an aqueous solution containing sodium hydroxide (using 50 g/l of Ace Clean 30 (produced by Okuno Chemical Industries Co., Ltd.), pH 12.5) at a liquid temperature of 48° C. Thereafter, washing with water was performed several times.

Subsequently, the second washing was performed by performing electrolysis in an electrolytic bath of the continuous plating apparatus having an alkaline pH (using 100 g/l of NC Rustol (produced by Okuno Chemical Industries Co., Ltd.) as an aqueous solution of sodium hydroxide, pH 13.2) using the base material subjected to the first washing as a cathode under the conditions of a liquid temperature of 50° C. and a current density of 5 A/dm$^2$ for 1 minute, and then washing with water was again repeated 5 times.

Next, the acid treatment with an acid for allowing the acid to act on the surface of the base material was performed by immersing the base material washed as such in an activation bath filled with sulfuric acid having a pH of 0.5 at a liquid temperature of 30° C. for 1 minute. Thereafter, washing with water was repeated 3 times.

Then, the step of forming a ground layer was performed to form the ground layer made of Ni for the base material processed as described above. Specifically, a plating bath of the continuous plating apparatus was filled with an Ni plating solution (containing 240 g/l of nickel sulfate, 45 g/l of nickel chloride and 40 g/l of boric acid), and electroplating was performed for 5 minutes under the conditions of a liquid temperature of 55° C., pH 3.8 and a current density of 4 A/dm$^2$ to form the ground layer of Ni. Thereafter, washing with water was performed 3 times.

Subsequently, with the base material having the ground layer formed as described above, the step of forming an Sn—Ag—Cu ternary alloy thin-film by electroplating on the whole surface of the base material (the ground layer) was performed. Specifically, the base material having the ground layer as formed was used as a cathode while an electrode made of Ti having its surface coated with Pt was used as an anode, and a plating bath of the continuous plating apparatus was filled with 250 g/l of an Sn compound (tin (Sn) methanesulfonate), 25 g/l of an Ag compound (silver (Ag) methanesulfonate), 8 g/l of a Cu compound (copper (Cu) methanesulfonate), 250 g/l (10 parts by mass relative to 1 part by mass of the Ag compound) of polymerized phosphate-based chelating agent (potassium triphosphate (potassium tripolyphosphate, $K_5O_{10}P_3$)) as an inorganic chelating agent, 80 g/l (10 parts by mass relative to 1 part by mass of the Cu compound) of a phthalocyanine (sodium phthalocyanine) as an organic chelating agent, and additives (30 cc/l of polyethylene glycol, 100 g/l of methanesulfonic acid), and electroplating was performed for 2 minutes under the conditions of a liquid temperature of 31° C., pH 0.5 and a current density of 10 A/dm$^2$. Accordingly the Sn—Ag—Cu ternary alloy thin-film was formed on the whole surface of the base material. After this, washing with water was performed 4 times, and drip-drying with air and drying with hot air of 70° C. for 2 minutes were performed. In this way, an article of the present invention was obtained that was a connector having the Sn—Ag—Cu ternary alloy thin-film formed on the base material.

For the article obtained as such, samples were taken at points of 10 m and 90 m from an end thereof, and cross sections thereof were cut using the FIB (Focused Ion Beam) apparatus to measure the thicknesses thereof. As a result, the ground layer of Ni had a thickness of 1.1 μm and the Sn—Ag—Cu ternary alloy thin-film had a thickness of 3.4 μm. Further, the thickness of the Sn—Ag—Cu ternary alloy thin-film was extremely uniform.

In addition, the alloy ratio of the Sn—Ag—Cu ternary alloy thin-film measured using the EPMA (Electron Probe Micro-Analyzer) was substantially uniform in the thin film that was 93.4 mass % of Sn, 5.0 mass % of Ag and 1.6 mass % of Cu. The melting point of the Sn—Ag—Cu ternary alloy thin-film was 227° C. and thus good solderability (low melting point) was shown. Further, the Sn—Ag—Cu ternary alloy thin-film was formed to have a fine granular crystalline state (particle size: 1 to 3 μm) as compared with a thin film made of Sn alone.

Furthermore, generation of a whisker was not observed even when the Sn—Ag—Cu ternary alloy thin-film was kept in a high temperature and high humidity bath (60° C., 90% humidity) for 2000 hours. That is, the Sn—Ag—Cu ternary alloy thin-film simultaneously achieving the prevention of whisker generation and the good solderability (namely low melting point) could be obtained.

Examples 17 to 19

Articles (Examples 17 to 19) of the present invention each having an Sn—Ag—Cu ternary alloy thin-film formed on a base material were obtained in an exactly similar manner to that of Example 16 except that a plating bath having the composition shown in Table 3 below was used instead of the plating bath for forming the Sn—Ag—Cu ternary alloy thin-film as used in Example 16. In Table 3, magnesium metaphosphate indicated as an inorganic chelating agent refers to a compound represented by $Mg_3O_8P_2$. As for the additive, although 100 g/l of an organic acid (dissociated to release the same anion as the anion contained in the Sn compound, Ag compound, Cu compound in each Example) is further contained in each Example, it is not indicated in Table 3.

For each of the articles obtained as such, samples were taken at points of 10 m and 90 m from an end thereof, and cross sections thereof were cut using the FIB apparatus to measure the thicknesses thereof. As a result, the ground layer made of Ni had a thickness of 1.1 μm and the Sn—Ag—Cu ternary alloy thin-film had a thickness as shown in Table 4 below. Further, the thickness of the Sn—Ag—Cu ternary alloy thin-film of any of the articles was extremely uniform.

In addition, the alloy ratio of the Sn—Ag—Cu ternary alloy thin-films each measured using the EPMA was substantially uniform in each thin film that was the alloy ratio as shown in Table 4 below. The melting point of the Sn—Ag—Cu ternary alloy thin-films each was the one as shown in Table 4 and thus good solderability was shown. Further, the Sn—Ag—Cu ternary alloy thin-films each was formed to have a fine granular crystalline state (particle size: 1 to 3 μm) as compared with a thin film made of Sn alone.

Furthermore, generation of a whisker was not observed even when the Sn—Ag—Cu ternary alloy thin-films each of any of the articles was kept in a high temperature and high humidity bath (60° C., 90% humidity) for 2000 hours. That is, the Sn—Ag—Cu ternary alloy thin-film simultaneously achieving the prevention of whisker generation and the good solderability (namely low melting point) could be formed.

said plating bath contains at least an Sn compound, an Ag compound, a Cu compound, an inorganic chelating agent, and an organic chelating agent, said inorganic chelating agent is a polymerized phosphate-based chelating agent or a metal fluoro complex-based chelating agent represented by a chemical formula (I):

$$MF_X^{(X-Y)-} \quad (I)$$

where M is an arbitrary metal, X is an arbitrary natural number and Y is an oxidation number of M, and at least 1 part by mass and at most 300 parts by mass of said inorganic chelating agent is contained relative to 1 part by mass of said Ag compound, and said organic chelating agent is a porphyrin, a dipivaloylmethane, a phthalocyanine or a compound represented by a chemical formula (II):

$$R—(CH_2CH_2O)_n-A \quad (II)$$

TABLE 3

| Example | Sn compound (g/l) | Ag compound (g/l) | Cu compound (g/l) | inorganic chelating agent (g/l) | organic chelating agent (g/l) | additive (cc/l) |
|---|---|---|---|---|---|---|
| 17 | tin (Sn) methanesulfonate (250) | silver (Ag) methanesulfonate (25) | copper (Cu) methanesulfonate (8) | $SiF_6^{2-}$ (250) | *1) (80) | polyethylene glycol (30) boric acid (20) *3) |
| 18 | tin (Sn) methanesulfonate (250) | silver (Ag) methanesulfonate (25) | copper (Cu) methanesulfonate (8) | magnesium metaphosphate (250) | dipivaloylmethane (80) | polyethylene glycol (30) |
| 19 | tin (Sn) methanesulfonate (250) | silver (Ag) methanesulfonate (25) | copper (Cu) methanesulfonate (8) | $TiF_6^{2-}$ (250) | *2) (80) | polyethylene glycol (30) boric acid (20) *3) |

*1) compound represented by R—(CH$_2$CH$_2$O)$_n$—A, where R is alkyl group with carbon number 18, A is CH$_2$SO$_4$Na and n is 5
*2) compound represented by R—(CH$_2$CH$_2$O)$_n$—A, where R is alkyl group with carbon number 12, A is CH$_2$COONa and n is 3
*3) the amount of added boric acid is 20 g/l

TABLE 4

| | alloy ratio (mass %) | | | thickness of ternary alloy | melting point of ternary alloy |
|---|---|---|---|---|---|
| Example | Sn | Ag | Cu | thin film (μm) | thin film (° C.) |
| 17 | 93.1 | 5.2 | 1.7 | 3.4 | 228 |
| 18 | 93.4 | 5.2 | 1.4 | 3.5 | 227 |
| 19 | 93.5 | 5.1 | 1.4 | 3.4 | 227 |

While embodiments and examples of the present invention have been described as above, it is originally intended that elements of the embodiments and examples are appropriately combined.

The embodiments and examples disclosed herein are by way of illustration and example in all respects, and are not to be taken by way of limitation. It is intended that the scope of the present invention is defined by claims, not by the description above, and includes all modifications within the meaning and range equivalent to that of the claims.

The invention claimed is:

1. A method of forming an Sn—Ag—Cu ternary alloy thin-film on a base material, wherein
said method includes the step of immersing said base material in a plating bath to form said Sn—Ag—Cu ternary alloy thin-film by electroplating entirely or partially on said base material, where R is an alkyl group having a carbon number of 8 to 30, A is CH$_2$COONa or CH$_2$SO$_4$Na and n is a natural number, and at least 1 part by mass and at most 200 parts by mass of said organic chelating agent is contained relative to 1 part by mass of said Cu compound.

2. The method of forming the Sn—Ag—Cu ternary alloy thin-film according to claim 1, wherein
said inorganic chelating agent is said polymerized phosphate-based chelating agent, and
said organic chelating agent is said porphyrin.

3. The method of forming the Sn—Ag—Cu ternary alloy thin-film according to claim 1, wherein
said inorganic chelating agent is the metal fluoro complex-based chelating agent represented by said chemical formula (I), and
said organic chelating agent is said porphyrin.

4. The method of forming the Sn—Ag—Cu ternary alloy thin-film according to claim 1, wherein
said inorganic chelating agent is the metal fluoro complex-based chelating agent represented by said chemical formula (I), and
said organic chelating agent is the compound represented by said chemical formula (II).

5. The method of forming the Sn—Ag—Cu ternary alloy thin-film according to claim 1, wherein
said Sn compound, said Ag compound and said Cu compound are each a soluble salt containing a common anion as a counter ion.

6. The method of forming the Sn—Ag—Cu ternary alloy thin-film according to claim 1, wherein
said polymerized phosphate-based chelating agent is a salt of a polymerized phosphoric acid and a metal that is at least one of Na, K, Mg, Al and Mn.

7. The method of forming the Sn—Ag—Cu ternary alloy thin-film according to claim 1, wherein
said metal fluoro complex-based chelating agent is $TiF_6^{2-}$ or $SiF_6^{2-}$.

8. The method of forming the Sn—Ag—Cu ternary alloy thin-film according to claim 1, wherein
said Sn—Ag—Cu ternary alloy thin-film is composed of 70 to 99.8 mass % of Sn, 0.1 to 15 mass % of Ag and 0.1 to 15 mass % of Cu, has a melting point of 200 to 240° C. and is formed in a fine granular crystalline state relative to a thin film made of Sn alone.

9. The method of forming the Sn—Ag—Cu ternary alloy thin-film according to claim 1, wherein
said base material is an electrically conductive base.

10. The method of forming the Sn—Ag—Cu ternary alloy thin-film according to claim 1, wherein
said base material is an electrically conductive base having an Sn layer formed entirely or partially on said electrically conductive base.

11. The method of forming the Sn—Ag—Cu ternary alloy thin-film according to claim 1, wherein
an insoluble plate is used as an anode in said plating bath.

* * * * *